US009909879B2

United States Patent
VonDerheide et al.

(10) Patent No.: US 9,909,879 B2
(45) Date of Patent: *Mar. 6, 2018

(54) SUCCESSIVE OFFER COMMUNICATIONS WITH AN OFFER RECIPIENT

(75) Inventors: James Alan VonDerheide, La Canada, CA (US); Rajasekaran Dhamodharan, Redwood City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,657

(22) Filed: Mar. 22, 2012

(65) Prior Publication Data
US 2012/0185315 A1 Jul. 19, 2012

Related U.S. Application Data

(63) Continuation of application No. 12/510,167, filed on Jul. 27, 2009.

(51) Int. Cl.
*G06Q 20/20* (2012.01)
*G01C 21/20* (2006.01)
(Continued)

(52) U.S. Cl.
CPC .......... *G01C 21/20* (2013.01); *G01C 21/362* (2013.01); *G06Q 10/02* (2013.01);
(Continued)

(58) Field of Classification Search
USPC ........................................................ 705/14
See application file for complete search history.

(56) References Cited

U.S. PATENT DOCUMENTS

| 4,630,108 A | 12/1986 | Gomersall |
| 4,906,826 A | 3/1990 | Spencer |

(Continued)

FOREIGN PATENT DOCUMENTS

| CA | 2715637 | 8/2009 |
| JP | 2000357204 | 12/2000 |

(Continued)

OTHER PUBLICATIONS

Cashmore, Pete, "YouTube Ads: YouHate Em," available at http://mashable.com/2009/04/05/youtube-ads-youhate-em/#, Apr. 5, 2009.

(Continued)

*Primary Examiner* — Sarah Monfeldt
*Assistant Examiner* — David P Sharvin
(74) *Attorney, Agent, or Firm* — The Webb Law Firm

(57) ABSTRACT

Successive offer communications are sent to an offer recipient. A first offer communication includes an offer of a merchant and the second offer communication includes an announcement about the offer. The first and second offer communications are each formatted to be rendered by respective communication device, such as a mobile phone of the offer recipient or a Point of Interaction (POI) terminal. The content of the offer communications may be tailored to the offer recipient based on the offer recipient's past transactions within a transaction processing system or a real time geographical location of the offer recipient.

17 Claims, 4 Drawing Sheets

(51) Int. Cl.
*G01C 21/36* (2006.01)
*G06Q 10/02* (2012.01)
*G06Q 30/02* (2012.01)
*G06Q 30/06* (2012.01)

(52) U.S. Cl.
CPC ..... *G06Q 30/0222* (2013.01); *G06Q 30/0226* (2013.01); *G06Q 30/0238* (2013.01); *G06Q 30/06* (2013.01)

(56) References Cited

U.S. PATENT DOCUMENTS

| | | |
|---|---|---|
| 4,914,590 A | 4/1990 | Loatman et al. |
| 5,025,372 A | 6/1991 | Burton et al. |
| 5,220,501 A | 6/1993 | Lawlor et al. |
| 5,401,946 A | 3/1995 | Weinblatt |
| 5,592,560 A | 1/1997 | Deaton et al. |
| 5,621,201 A | 4/1997 | Langhans et al. |
| 5,621,812 A | 4/1997 | Deaton et al. |
| 5,638,457 A | 6/1997 | Deaton et al. |
| 5,675,510 A | 10/1997 | Coffey et al. |
| 5,684,990 A | 11/1997 | Boothby |
| 5,687,322 A | 11/1997 | Deaton et al. |
| 5,692,017 A | 11/1997 | Shiokawa |
| 5,710,884 A | 1/1998 | Dedrick |
| 5,710,886 A | 1/1998 | Christensen et al. |
| 5,717,923 A | 2/1998 | Dedrick |
| 5,924,080 A | 7/1999 | Johnson et al. |
| 5,974,396 A | 10/1999 | Anderson et al. |
| 6,009,415 A | 12/1999 | Shurling et al. |
| 6,018,723 A | 1/2000 | Siegel et al. |
| 6,035,280 A | 3/2000 | Christensen et al. |
| 6,055,573 A | 4/2000 | Gardenswartz et al. |
| 6,061,660 A * | 5/2000 | Eggleston et al. ......... 705/14.12 |
| 6,065,675 A | 5/2000 | Teicher |
| 6,070,147 A | 5/2000 | Harms et al. |
| 6,078,740 A | 6/2000 | DeTreville |
| 6,101,484 A | 8/2000 | Halbert et al. |
| 6,119,101 A | 9/2000 | Peckover |
| 6,119,103 A | 9/2000 | Basch et al. |
| 6,119,933 A | 9/2000 | Wong et al. |
| 6,216,129 B1 | 4/2001 | Eldering |
| 6,226,642 B1 | 5/2001 | Beranek et al. |
| 6,282,516 B1 | 8/2001 | Giuliani |
| 6,282,522 B1 | 8/2001 | Davis |
| 6,285,983 B1 | 9/2001 | Jenkins |
| 6,298,330 B1 | 10/2001 | Gardenswartz |
| 6,307,958 B1 | 10/2001 | Deaton et al. |
| 6,321,201 B1 | 11/2001 | Jenkins |
| 6,324,519 B1 | 11/2001 | Eldering |
| 6,327,574 B1 | 12/2001 | Kramer et al. |
| 6,332,126 B1 | 12/2001 | Pierce et al. |
| 6,334,110 B1 | 12/2001 | Walter |
| 6,377,935 B1 | 4/2002 | Deaton et al. |
| 6,404,884 B1 | 6/2002 | Marwell et al. |
| 6,424,951 B1 | 7/2002 | Shurling et al. |
| 6,450,407 B1 | 9/2002 | Freeman et al. |
| 6,487,538 B1 | 11/2002 | Gupta et al. |
| 6,505,168 B1 | 1/2003 | Rothman |
| 6,519,571 B1 | 2/2003 | Guheen |
| 6,571,279 B1 | 5/2003 | Herz et al. |
| 6,598,030 B1 | 7/2003 | Siegel et al. |
| 6,604,239 B1 | 8/2003 | Kohen |
| 6,604,489 B2 | 8/2003 | Van Horn et al. |
| 6,631,356 B1 | 10/2003 | Van Horn et al. |
| 6,631,372 B1 | 10/2003 | Graham |
| 6,658,393 B1 | 12/2003 | Basch et al. |
| 6,742,003 B2 | 5/2004 | Heckerman et al. |
| 6,834,110 B1 | 12/2004 | Marconcini et al. |
| 6,839,682 B1 | 1/2005 | Blume et al. |
| 6,856,992 B2 | 2/2005 | Britton et al. |
| 6,862,575 B1 | 3/2005 | Anttila et al. |
| 6,882,977 B1 | 4/2005 | Miller |
| 6,901,406 B2 | 5/2005 | Nabe |
| 6,922,686 B2 | 7/2005 | Okamoto et al. |
| 6,934,508 B2 | 8/2005 | Ceresoli et al. |
| 6,934,690 B1 | 8/2005 | Van Horn et al. |
| 6,938,022 B1 | 8/2005 | Singhal |
| 6,941,376 B2 | 9/2005 | Mitchell et al. |
| 6,996,560 B1 | 2/2006 | Choi |
| 7,003,476 B1 | 2/2006 | Samra |
| 7,024,374 B1 | 4/2006 | Day |
| 7,024,409 B2 | 4/2006 | Iyengar |
| 7,035,855 B1 | 4/2006 | Kilger et al. |
| 7,039,599 B2 | 5/2006 | Merriman |
| 7,054,886 B2 | 5/2006 | Stern et al. |
| 7,062,510 B1 | 6/2006 | Eldering |
| 7,069,197 B1 | 6/2006 | Saidane |
| 7,069,244 B2 | 6/2006 | Strayer et al. |
| 7,072,847 B2 | 7/2006 | Ulenas et al. |
| 7,107,230 B1 | 9/2006 | Halbert et al. |
| 7,107,249 B2 | 9/2006 | Dively |
| 7,120,590 B1 | 10/2006 | Eisen |
| 7,124,099 B2 | 10/2006 | Mesaros |
| 7,143,143 B1 | 11/2006 | Thompson |
| 7,146,330 B1 | 12/2006 | Alon et al. |
| 7,158,943 B2 | 1/2007 | Van Der Riet |
| 7,158,955 B2 | 1/2007 | Dively |
| 7,162,436 B1 | 1/2007 | Eckel, Jr. |
| 7,165,037 B2 | 1/2007 | Lazarus et al. |
| 7,177,822 B2 | 2/2007 | Mahmood et al. |
| 7,181,412 B1 | 2/2007 | Fulgoni |
| 7,181,419 B1 | 2/2007 | Mesaros |
| 7,194,422 B1 | 3/2007 | St. John Killick |
| 7,194,427 B1 | 3/2007 | Van Horn et al. |
| 7,225,142 B1 | 5/2007 | Apte |
| 7,227,950 B2 | 6/2007 | Faith et al. |
| 7,260,837 B2 | 8/2007 | Abraham |
| 7,263,498 B1 | 8/2007 | Van Horn et al. |
| 7,264,152 B2 | 9/2007 | Tsuei et al. |
| 7,269,578 B2 | 9/2007 | Sweeney |
| 7,299,194 B1 | 11/2007 | Manganaris |
| 7,328,169 B2 | 2/2008 | Temares |
| 7,333,998 B2 | 2/2008 | Heckerman et al. |
| 7,337,127 B1 | 2/2008 | Smith |
| 7,340,438 B2 | 3/2008 | Nordman et al. |
| 7,346,562 B2 | 3/2008 | Inoue et al. |
| 7,359,866 B2 | 4/2008 | Farat |
| 7,360,251 B2 | 4/2008 | Spalink et al. |
| 7,363,246 B1 | 4/2008 | Van Horn et al. |
| 7,373,311 B2 | 5/2008 | Lambert et al. |
| 7,379,901 B1 | 5/2008 | Philyaw |
| 7,398,225 B2 | 7/2008 | Voltmer et al. |
| 7,398,226 B2 | 7/2008 | Haines et al. |
| 7,401,731 B1 | 7/2008 | Pletz et al. |
| 7,415,537 B1 | 8/2008 | Maes |
| 7,424,439 B1 | 9/2008 | Fayyad et al. |
| 7,424,441 B2 | 9/2008 | George |
| 7,428,498 B2 | 9/2008 | Voltmer et al. |
| 7,444,658 B1 | 10/2008 | Matz et al. |
| 7,480,627 B1 | 1/2009 | Van Horn et al. |
| 7,490,052 B2 | 2/2009 | Kilger et al. |
| 7,493,655 B2 | 2/2009 | Brown |
| 7,496,524 B2 | 2/2009 | Voltmer et al. |
| 7,512,542 B1 | 3/2009 | Kriss et al. |
| 7,526,458 B2 | 4/2009 | Flinn et al. |
| 7,526,485 B2 | 4/2009 | Hagan et al. |
| 7,533,038 B2 | 5/2009 | Blume |
| 7,533,130 B2 | 5/2009 | Narayana et al. |
| 7,536,360 B2 | 5/2009 | Stolfo et al. |
| 7,552,069 B2 | 6/2009 | Kepecs |
| 7,562,030 B1 | 7/2009 | Shapira |
| 7,571,139 B1 | 8/2009 | Giordano et al. |
| 7,578,430 B2 | 8/2009 | Michelsen |
| 7,578,435 B2 | 8/2009 | Suk |
| 7,593,871 B1 | 9/2009 | Mesaros |
| 7,613,628 B2 | 11/2009 | Ariff et al. |
| 7,613,629 B2 | 11/2009 | Antonucci et al. |
| 7,624,184 B1 | 11/2009 | Aviani et al. |
| 7,636,677 B1 | 12/2009 | McGonigal et al. |
| 7,665,107 B2 | 2/2010 | Goodman et al. |
| 7,676,400 B1 | 3/2010 | Dillon |
| 7,689,463 B1 | 3/2010 | Mesaros |
| 7,689,469 B1 | 3/2010 | Mesaros |

(56) References Cited

U.S. PATENT DOCUMENTS

| | | |
|---|---|---|
| 7,693,748 B1 | 4/2010 | Mesaros |
| 7,729,945 B1 | 6/2010 | Katz et al. |
| 7,729,977 B2 | 6/2010 | Xiao et al. |
| 7,747,473 B1 | 6/2010 | Mesaros |
| 7,752,134 B2 | 7/2010 | Spear |
| 7,828,206 B2 | 11/2010 | Hessburg et al. |
| 7,848,960 B2 | 12/2010 | Rampell et al. |
| 7,860,759 B2 | 12/2010 | Stoppelman |
| 7,904,337 B2 | 3/2011 | Morsa |
| 7,904,389 B2 | 3/2011 | DiGioacchino |
| 7,908,159 B1 | 3/2011 | Ordonez et al. |
| 7,917,388 B2 | 3/2011 | Van Der Riet |
| 7,933,841 B2 | 4/2011 | Schmeyer et al. |
| 7,953,219 B2 | 5/2011 | Freedman et al. |
| 7,953,630 B2 | 5/2011 | Fowler et al. |
| 8,027,912 B1 | 9/2011 | Thomas |
| 8,041,634 B2 | 10/2011 | Eastley et al. |
| 8,050,968 B2 | 11/2011 | Antonucci et al. |
| 8,055,536 B1 | 11/2011 | Olaiya et al. |
| 8,103,545 B2 | 1/2012 | Ramer et al. |
| 8,131,875 B1 * | 3/2012 | Chen et al. .............. 709/246 |
| 8,140,389 B2 | 3/2012 | Altberg et al. |
| 8,265,989 B2 | 9/2012 | Dodge et al. |
| 8,313,023 B1 | 11/2012 | McGhie et al. |
| 8,342,399 B1 | 1/2013 | McGhie et al. |
| 8,387,858 B2 | 3/2013 | Bohn et al. |
| 8,473,411 B2 | 6/2013 | Baumgartner, IV et al. |
| 8,495,680 B2 | 7/2013 | Bentolila et al. |
| 8,511,550 B1 | 8/2013 | McGhie et al. |
| 8,595,058 B2 | 11/2013 | Fordyce, III et al. |
| 8,606,630 B2 | 12/2013 | Fordyce, III et al. |
| 8,620,738 B2 | 12/2013 | Fordyce, III et al. |
| 8,626,579 B2 | 1/2014 | Fordyce, III et al. |
| 8,666,812 B1 | 3/2014 | Gandhi |
| 8,676,639 B2 | 3/2014 | Perlman et al. |
| 8,688,503 B2 | 4/2014 | Kala et al. |
| 8,738,486 B2 | 5/2014 | McGeehan |
| 8,744,906 B2 | 6/2014 | Fordyce, III et al. |
| 8,768,314 B2 | 7/2014 | Chien |
| 8,781,881 B2 | 7/2014 | Olives et al. |
| 8,793,184 B2 | 7/2014 | Lakshminarayanan |
| 8,833,645 B2 | 9/2014 | Stretch et al. |
| 8,843,391 B2 | 9/2014 | Fordyce, III et al. |
| 9,031,860 B2 | 5/2015 | Winters et al. |
| 9,342,835 B2 | 5/2016 | Fordyce, III et al. |
| 2001/0027413 A1 | 10/2001 | Bhutta |
| 2001/0049620 A1 | 12/2001 | Blasko |
| 2002/0004733 A1 | 1/2002 | Addante |
| 2002/0019768 A1 | 2/2002 | Fredrickson et al. |
| 2002/0026348 A1 | 2/2002 | Fowler et al. |
| 2002/0032602 A1 | 3/2002 | Lanzillo et al. |
| 2002/0032904 A1 | 3/2002 | Lerner |
| 2002/0042738 A1 | 4/2002 | Srinivasan et al. |
| 2002/0046187 A1 | 4/2002 | Vargaset et al. |
| 2002/0053076 A1 | 5/2002 | Landesmann |
| 2002/0059100 A1 | 5/2002 | Shore |
| 2002/0065723 A1 | 5/2002 | Anderson et al. |
| 2002/0072931 A1 | 6/2002 | Card |
| 2002/0082920 A1 | 6/2002 | Austin et al. |
| 2002/0091569 A1 | 7/2002 | Kitaura et al. |
| 2002/0095387 A1 | 7/2002 | Sosa et al. |
| 2002/0099609 A1 | 7/2002 | Nascenzi et al. |
| 2002/0099649 A1 | 7/2002 | Lee et al. |
| 2002/0107738 A1 | 8/2002 | Beach et al. |
| 2002/0123928 A1 | 9/2002 | Eldering et al. |
| 2002/0128904 A1 | 9/2002 | Carruthers et al. |
| 2002/0128908 A1 | 9/2002 | Levin et al. |
| 2002/0128916 A1 | 9/2002 | Beinecke, III |
| 2002/0133400 A1 | 9/2002 | Terry et al. |
| 2002/0133405 A1 | 9/2002 | Newnam et al. |
| 2002/0138346 A1 | 9/2002 | Kodaka |
| 2002/0143655 A1 | 10/2002 | Elston et al. |
| 2002/0147645 A1 | 10/2002 | Alao et al. |
| 2002/0161625 A1 | 10/2002 | Brito-Valladares et al. |
| 2002/0174013 A1 | 11/2002 | Freeman et al. |
| 2002/0183046 A1 | 12/2002 | Joyce et al. |
| 2002/0194137 A1 | 12/2002 | Park et al. |
| 2003/0004808 A1 | 1/2003 | Elhaoussine et al. |
| 2003/0007886 A1 | 1/2003 | Hwa et al. |
| 2003/0009368 A1 | 1/2003 | Kitts |
| 2003/0009393 A1 | 1/2003 | Norris |
| 2003/0018652 A1 | 1/2003 | Heckerman et al. |
| 2003/0047602 A1 | 3/2003 | Iida et al. |
| 2003/0074267 A1 | 4/2003 | Acharya et al. |
| 2003/0115113 A1 | 6/2003 | Duncan |
| 2003/0130904 A1 | 7/2003 | Katz et al. |
| 2003/0144935 A1 | 7/2003 | Sobek |
| 2003/0191832 A1 | 10/2003 | Satyavolu et al. |
| 2004/0019518 A1 | 1/2004 | Abraham |
| 2004/0024632 A1 | 2/2004 | Perry |
| 2004/0030667 A1 | 2/2004 | Ku Cheng et al. |
| 2004/0054577 A1 | 3/2004 | Inoue et al. |
| 2004/0054581 A1 | 3/2004 | Redford |
| 2004/0054591 A1 | 3/2004 | Spaeth et al. |
| 2004/0073482 A1 | 4/2004 | Wiggins et al. |
| 2004/0099730 A1 | 5/2004 | Tuchler et al. |
| 2004/0122735 A1 | 6/2004 | Meshkin |
| 2004/0122736 A1 * | 6/2004 | Strock et al. .............. 705/14 |
| 2004/0127192 A1 | 7/2004 | Ceresoli et al. |
| 2004/0133474 A1 | 7/2004 | Tami et al. |
| 2004/0181554 A1 | 9/2004 | Heckerman et al. |
| 2004/0193489 A1 | 9/2004 | Boyd et al. |
| 2004/0193685 A1 | 9/2004 | Proehl |
| 2004/0225509 A1 | 11/2004 | Andre |
| 2004/0225603 A1 | 11/2004 | Allen et al. |
| 2004/0249650 A1 | 12/2004 | Freedman et al. |
| 2004/0249710 A1 | 12/2004 | Smith et al. |
| 2004/0267611 A1 | 12/2004 | Hoerenz |
| 2005/0021397 A1 | 1/2005 | Cui et al. |
| 2005/0055275 A1 | 3/2005 | Newman et al. |
| 2005/0071225 A1 | 3/2005 | Bortolin et al. |
| 2005/0071227 A1 | 3/2005 | Hammad et al. |
| 2005/0071230 A1 | 3/2005 | Mankoff |
| 2005/0075932 A1 | 4/2005 | Mankoff |
| 2005/0131762 A1 | 6/2005 | Bharat et al. |
| 2005/0131792 A1 | 6/2005 | Rowe |
| 2005/0160002 A1 | 7/2005 | Roetter |
| 2005/0160003 A1 | 7/2005 | Berardi et al. |
| 2005/0197954 A1 | 9/2005 | Maitland et al. |
| 2005/0216421 A1 | 9/2005 | Barry et al. |
| 2005/0216823 A1 | 9/2005 | Petersen et al. |
| 2005/0222929 A1 | 10/2005 | Steier et al. |
| 2005/0235310 A1 | 10/2005 | Bies |
| 2005/0251446 A1 | 11/2005 | Jiang et al. |
| 2006/0015405 A1 | 1/2006 | Bala et al. |
| 2006/0053056 A1 | 3/2006 | Alspach-Goss et al. |
| 2006/0069619 A1 | 3/2006 | Walker et al. |
| 2006/0103667 A1 | 5/2006 | Amit et al. |
| 2006/0143071 A1 | 6/2006 | Hofmann |
| 2006/0143072 A1 | 6/2006 | Herman et al. |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0190337 A1 | 8/2006 | Ayers, Jr. |
| 2006/0218038 A1 | 9/2006 | Grider |
| 2006/0224454 A1 | 10/2006 | Kantor et al. |
| 2006/0229936 A1 | 10/2006 | Cahill |
| 2006/0230053 A1 | 10/2006 | Eldering |
| 2006/0253320 A1 | 11/2006 | Heywood |
| 2006/0253323 A1 | 11/2006 | Phan et al. |
| 2006/0259362 A1 | 11/2006 | Cates |
| 2006/0265280 A1 | 11/2006 | Nakada et al. |
| 2006/0265429 A1 * | 11/2006 | Pendergast et al. .......... 707/201 |
| 2006/0282310 A1 | 12/2006 | Burch |
| 2006/0287916 A1 | 12/2006 | Starr et al. |
| 2006/0293948 A1 | 12/2006 | Weinblatt |
| 2007/0033104 A1 | 2/2007 | Collins et al. |
| 2007/0038516 A1 | 2/2007 | Apple et al. |
| 2007/0055597 A1 | 3/2007 | Patel |
| 2007/0061256 A1 | 3/2007 | Park et al. |
| 2007/0067267 A1 | 3/2007 | Ives |
| 2007/0067297 A1 | 3/2007 | Kublickis et al. |
| 2007/0073585 A1 | 3/2007 | Apple et al. |

(56) References Cited

U.S. PATENT DOCUMENTS

| | | |
|---|---|---|
| 2007/0084917 A1 | 4/2007 | Fajkowski |
| 2007/0100691 A1 | 5/2007 | Patterson et al. |
| 2007/0106564 A1 | 5/2007 | Matotek et al. |
| 2007/0124201 A1 | 5/2007 | Hu et al. |
| 2007/0129963 A1 | 6/2007 | Skibinski et al. |
| 2007/0150352 A1 | 6/2007 | Kelly-Frank et al. |
| 2007/0156517 A1 | 7/2007 | Kaplan et al. |
| 2007/0162377 A1 | 7/2007 | Williams |
| 2007/0174295 A1 | 7/2007 | Abraham |
| 2007/0179846 A1 | 8/2007 | Jain et al. |
| 2007/0185844 A1 | 8/2007 | Schachter |
| 2007/0192121 A1 | 8/2007 | Routson |
| 2007/0192122 A1 | 8/2007 | Routson et al. |
| 2007/0219865 A1 | 9/2007 | Leining |
| 2007/0219866 A1 | 9/2007 | Wolf et al. |
| 2007/0226056 A1 | 9/2007 | Belanger |
| 2007/0226061 A1 | 9/2007 | Chen et al. |
| 2007/0233571 A1 | 10/2007 | Eldering et al. |
| 2007/0239532 A1 | 10/2007 | Benson et al. |
| 2007/0244741 A1 | 10/2007 | Blume |
| 2007/0260521 A1 | 11/2007 | Van Der Riet |
| 2007/0260736 A1 | 11/2007 | Miller |
| 2007/0265923 A1 | 11/2007 | Krassner et al. |
| 2007/0282681 A1 | 12/2007 | Shubert et al. |
| 2007/0288312 A1 | 12/2007 | Wang |
| 2007/0299777 A1 | 12/2007 | Shraim et al. |
| 2008/0004884 A1 | 1/2008 | Flake |
| 2008/0005037 A1 | 1/2008 | Hammad et al. |
| 2008/0021772 A1 | 1/2008 | Aloni et al. |
| 2008/0021870 A1 | 1/2008 | Birnbaum et al. |
| 2008/0046358 A1 | 2/2008 | Holm-Blagg |
| 2008/0056541 A1 | 3/2008 | Tani et al. |
| 2008/0059302 A1 | 3/2008 | Fordyce, III |
| 2008/0059303 A1 | 3/2008 | Fordyce, III |
| 2008/0059306 A1 | 3/2008 | Fordyce, III |
| 2008/0059307 A1 | 3/2008 | Fordyce, III |
| 2008/0065507 A1 | 3/2008 | Morrison et al. |
| 2008/0071587 A1 | 3/2008 | Granucci et al. |
| 2008/0071680 A1 | 3/2008 | Sheets |
| 2008/0077487 A1 | 3/2008 | Davis |
| 2008/0077499 A1 | 3/2008 | Ariff et al. |
| 2008/0082393 A1 | 4/2008 | Ozzie et al. |
| 2008/0082397 A1 | 4/2008 | Dennison et al. |
| 2008/0082418 A1 | 4/2008 | Fordyce, III |
| 2008/0097851 A1 | 4/2008 | Bemmel et al. |
| 2008/0103887 A1 | 5/2008 | Oldham |
| 2008/0103888 A1 | 5/2008 | Nick |
| 2008/0117202 A1 | 5/2008 | Martinez et al. |
| 2008/0120182 A1 | 5/2008 | Arnold et al. |
| 2008/0120218 A1 | 5/2008 | Reid et al. |
| 2008/0126261 A1 | 5/2008 | Lovett |
| 2008/0133350 A1 | 6/2008 | White et al. |
| 2008/0133351 A1* | 6/2008 | White ............... G06Q 20/387 705/14.27 |
| 2008/0133409 A1 | 6/2008 | Eastley et al. |
| 2008/0134228 A1 | 6/2008 | Dion et al. |
| 2008/0147731 A1 | 6/2008 | Narayana et al. |
| 2008/0154703 A1 | 6/2008 | Flake |
| 2008/0154704 A1 | 6/2008 | Flake |
| 2008/0154727 A1 | 6/2008 | Carlson |
| 2008/0162258 A1 | 7/2008 | Kala et al. |
| 2008/0162269 A1 | 7/2008 | Gilbert |
| 2008/0167991 A1 | 7/2008 | Carlson et al. |
| 2008/0167992 A1 | 7/2008 | Kokernak |
| 2008/0177602 A1 | 7/2008 | Sopher et al. |
| 2008/0184117 A1 | 7/2008 | Alsbury et al. |
| 2008/0195465 A1 | 8/2008 | Redmond et al. |
| 2008/0195473 A1 | 8/2008 | Laramy |
| 2008/0201226 A1* | 8/2008 | Carlson et al. ............ 705/14 |
| 2008/0215436 A1 | 9/2008 | Roberts et al. |
| 2008/0217397 A1 | 9/2008 | Degliantoni et al. |
| 2008/0221972 A1 | 9/2008 | Megdal et al. |
| 2008/0228582 A1 | 9/2008 | Fordyce et al. |
| 2008/0235243 A1 | 9/2008 | Lee et al. |
| 2008/0242317 A1* | 10/2008 | Abhyanker ......... G06F 17/3087 455/456.3 |
| 2008/0255946 A1 | 10/2008 | Altberg et al. |
| 2008/0275771 A1* | 11/2008 | Levine ............... 705/14 |
| 2008/0275779 A1 | 11/2008 | Lakshminarayanan |
| 2008/0281668 A1 | 11/2008 | Nurminen |
| 2008/0281699 A1 | 11/2008 | Whitehead |
| 2008/0288889 A1 | 11/2008 | Hunt et al. |
| 2008/0300973 A1 | 12/2008 | DeWitt et al. |
| 2008/0301037 A1 | 12/2008 | Monk |
| 2008/0301102 A1* | 12/2008 | Liang ............... 707/3 |
| 2008/0306790 A1* | 12/2008 | Otto et al. ............ 705/7 |
| 2008/0318559 A1 | 12/2008 | Porco et al. |
| 2008/0319843 A1 | 12/2008 | Moser |
| 2008/0319847 A1 | 12/2008 | Shepard |
| 2008/0320512 A1 | 12/2008 | Knight |
| 2009/0006203 A1 | 1/2009 | Fordyce, III |
| 2009/0006363 A1 | 1/2009 | Canny |
| 2009/0018895 A1 | 1/2009 | Lee |
| 2009/0018996 A1 | 1/2009 | Hunt et al. |
| 2009/0030793 A1 | 1/2009 | Fordyce, III |
| 2009/0036103 A1* | 2/2009 | Byerley et al. ............ 455/414.1 |
| 2009/0043593 A1 | 2/2009 | Herbrich et al. |
| 2009/0043648 A1 | 2/2009 | Mahdian et al. |
| 2009/0048884 A1 | 2/2009 | Rolland et al. |
| 2009/0063351 A1 | 3/2009 | Schmeyer et al. |
| 2009/0070219 A1 | 3/2009 | D'Angelo |
| 2009/0070225 A1 | 3/2009 | Matz et al. |
| 2009/0075592 A1 | 3/2009 | Nystrom et al. |
| 2009/0076896 A1 | 3/2009 | DeWitt et al. |
| 2009/0076925 A1 | 3/2009 | DeWitt et al. |
| 2009/0084842 A1 | 4/2009 | Vriheas et al. |
| 2009/0112703 A1 | 4/2009 | Brown |
| 2009/0112721 A1 | 4/2009 | Hammad et al. |
| 2009/0119160 A1 | 5/2009 | Woda |
| 2009/0119167 A1 | 5/2009 | Kendall |
| 2009/0119170 A1 | 5/2009 | Hammad et al. |
| 2009/0125396 A1* | 5/2009 | Otto ............... G06Q 10/087 705/14.26 |
| 2009/0132347 A1 | 5/2009 | Anderson et al. |
| 2009/0132365 A1 | 5/2009 | Gruenhagen et al. |
| 2009/0132366 A1 | 5/2009 | Lam |
| 2009/0132395 A1 | 5/2009 | Lam et al. |
| 2009/0132404 A1 | 5/2009 | King et al. |
| 2009/0144122 A1 | 6/2009 | David et al. |
| 2009/0144146 A1 | 6/2009 | Jonathan et al. |
| 2009/0144201 A1 | 6/2009 | Gierkink et al. |
| 2009/0144205 A1 | 6/2009 | Hurry |
| 2009/0144392 A1 | 6/2009 | Wang et al. |
| 2009/0157511 A1 | 6/2009 | Spinnell |
| 2009/0157512 A1 | 6/2009 | King |
| 2009/0171753 A1 | 7/2009 | Karthic |
| 2009/0171777 A1 | 7/2009 | Powell |
| 2009/0171778 A1 | 7/2009 | Powell |
| 2009/0172551 A1 | 7/2009 | Kane |
| 2009/0172728 A1 | 7/2009 | Shkedi et al. |
| 2009/0177744 A1 | 7/2009 | Marlow et al. |
| 2009/0182625 A1 | 7/2009 | Kilger et al. |
| 2009/0187462 A1 | 7/2009 | Gevelber et al. |
| 2009/0191811 A1 | 7/2009 | Griffin et al. |
| 2009/0192876 A1 | 7/2009 | De et al. |
| 2009/0192882 A1 | 7/2009 | Narahashi |
| 2009/0204472 A1 | 8/2009 | Einhorn |
| 2009/0216579 A1 | 8/2009 | Zen et al. |
| 2009/0216606 A1* | 8/2009 | Coffman ............... G06Q 30/02 705/14.1 |
| 2009/0216616 A1 | 8/2009 | Wang et al. |
| 2009/0222323 A1 | 9/2009 | Kelly |
| 2009/0234708 A1 | 9/2009 | Heiser, II |
| 2009/0234711 A1 | 9/2009 | Ramer et al. |
| 2009/0234715 A1* | 9/2009 | Heiser et al. ............ 705/10 |
| 2009/0234737 A1 | 9/2009 | Sarelson |
| 2009/0248496 A1 | 10/2009 | Hueter |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwartz et al. |
| 2009/0254476 A1 | 10/2009 | Sharma |
| 2009/0259518 A1 | 10/2009 | Harvey et al. |

(56) References Cited

U.S. PATENT DOCUMENTS

| | | |
|---|---|---|
| 2009/0271265 A1 | 10/2009 | Lay et al. |
| 2009/0271305 A1 | 10/2009 | Lal et al. |
| 2009/0271327 A1 | 10/2009 | Lal |
| 2009/0276317 A1 | 11/2009 | Dixon et al. |
| 2009/0281873 A1 | 11/2009 | Yaskin |
| 2009/0299820 A1 | 12/2009 | Wang et al. |
| 2009/0299846 A1 | 12/2009 | Brueggemann et al. |
| 2009/0300490 A1 | 12/2009 | Lejano et al. |
| 2009/0309711 A1 | 12/2009 | Adappa et al. |
| 2009/0313041 A1 | 12/2009 | Eder |
| 2009/0313163 A1 | 12/2009 | Wang et al. |
| 2009/0319359 A1 | 12/2009 | Soza et al. |
| 2009/0327892 A1 | 12/2009 | Douillet et al. |
| 2010/0004980 A1 | 1/2010 | Bowen |
| 2010/0030644 A1* | 2/2010 | Dhamodharan ............ 705/14.49 |
| 2010/0042517 A1 | 2/2010 | Paintin et al. |
| 2010/0049620 A1 | 2/2010 | Debow |
| 2010/0057549 A1 | 3/2010 | Boal |
| 2010/0057586 A1* | 3/2010 | Chow ............................. 705/26 |
| 2010/0094694 A1 | 4/2010 | Shapiro |
| 2010/0106568 A1 | 4/2010 | Grimes |
| 2010/0106569 A1 | 4/2010 | Grimes |
| 2010/0106570 A1 | 4/2010 | Radu et al. |
| 2010/0106589 A1 | 4/2010 | Etheredge et al. |
| 2010/0114654 A1 | 5/2010 | Lukose et al. |
| 2010/0114677 A1* | 5/2010 | Carlson et al. ............ 705/14.1 |
| 2010/0114683 A1 | 5/2010 | Wessels |
| 2010/0114686 A1 | 5/2010 | Carlson |
| 2010/0121726 A1 | 5/2010 | Coulter et al. |
| 2010/0121727 A1 | 5/2010 | Coulter et al. |
| 2010/0121767 A1 | 5/2010 | Coulter et al. |
| 2010/0153242 A1 | 6/2010 | Preston |
| 2010/0161379 A1* | 6/2010 | Bene et al. ..................... 705/10 |
| 2010/0161404 A1 | 6/2010 | Taylor |
| 2010/0161457 A1 | 6/2010 | Katz et al. |
| 2010/0169192 A1 | 7/2010 | Zoldi et al. |
| 2010/0174607 A1* | 7/2010 | Henkin et al. ............ 705/14.53 |
| 2010/0174623 A1 | 7/2010 | McPhie |
| 2010/0191594 A1 | 7/2010 | White et al. |
| 2010/0198673 A1 | 8/2010 | Quinlan et al. |
| 2010/0211469 A1 | 8/2010 | Salmon et al. |
| 2010/0250338 A1 | 9/2010 | Banerjee |
| 2010/0257239 A1 | 10/2010 | Roberts |
| 2010/0274625 A1 | 10/2010 | Carlson |
| 2010/0274627 A1 | 10/2010 | Carlson |
| 2010/0280880 A1* | 11/2010 | Faith et al. ..................... 705/10 |
| 2010/0280881 A1 | 11/2010 | Faith |
| 2010/0280882 A1 | 11/2010 | Faith |
| 2010/0280927 A1 | 11/2010 | Faith |
| 2010/0280950 A1 | 11/2010 | Faith |
| 2010/0299213 A1 | 11/2010 | Yeganeh |
| 2010/0306029 A1 | 12/2010 | Jolley |
| 2010/0306032 A1 | 12/2010 | Jolley |
| 2011/0016103 A1* | 1/2011 | Sivakumar et al. ......... 707/706 |
| 2011/0022424 A1 | 1/2011 | Von Derheide |
| 2011/0035278 A1 | 2/2011 | Fordyce, III |
| 2011/0035280 A1 | 2/2011 | Fordyce, III |
| 2011/0035288 A1 | 2/2011 | Clyne |
| 2011/0047072 A1 | 2/2011 | Ciurea |
| 2011/0054981 A1 | 3/2011 | Faith et al. |
| 2011/0087519 A1 | 4/2011 | Fordyce, III |
| 2011/0087530 A1 | 4/2011 | Fordyce, III |
| 2011/0087531 A1 | 4/2011 | Winters et al. |
| 2011/0087546 A1 | 4/2011 | Fordyce, III |
| 2011/0087547 A1 | 4/2011 | Amaro et al. |
| 2011/0087550 A1 | 4/2011 | Fordyce, III |
| 2011/0093324 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0106601 A1 | 5/2011 | Perlman et al. |
| 2011/0106607 A1 | 5/2011 | Alfonso et al. |
| 2011/0106840 A1 | 5/2011 | Barrett |
| 2011/0125565 A1 | 5/2011 | MacIlwaine et al. |
| 2011/0145081 A1 | 6/2011 | Tomchek et al. |
| 2011/0178845 A1 | 7/2011 | Rane et al. |
| 2011/0251880 A1 | 10/2011 | Butler et al. |
| 2011/0251892 A1 | 10/2011 | Laracey |
| 2011/0270618 A1 | 11/2011 | Banerjee et al. |
| 2011/0276383 A1* | 11/2011 | Heiser et al. .............. 705/14.25 |
| 2011/0288918 A1 | 11/2011 | Cervenka |
| 2011/0302022 A1 | 12/2011 | Fordyce, III |
| 2011/0302036 A1 | 12/2011 | Fordyce, III |
| 2011/0302039 A1 | 12/2011 | Fordyce, III |
| 2012/0010931 A1* | 1/2012 | Mehra et al. .............. 705/14.16 |
| 2012/0041808 A1 | 2/2012 | Hofer et al. |
| 2012/0109709 A1 | 5/2012 | Fordyce, III et al. |
| 2012/0109734 A1 | 5/2012 | Fordyce, III et al. |
| 2012/0150601 A1 | 6/2012 | Fisher |
| 2012/0166261 A1 | 6/2012 | Velusamy et al. |
| 2012/0191525 A1 | 7/2012 | Singh |
| 2012/0215584 A1 | 8/2012 | Narsude et al. |
| 2012/0215610 A1 | 8/2012 | Amaro et al. |
| 2012/0253914 A1 | 10/2012 | Black |
| 2012/0303438 A1 | 11/2012 | Futty et al. |
| 2013/0035975 A1 | 2/2013 | Cavander et al. |
| 2013/0124298 A1 | 5/2013 | Li et al. |
| 2013/0191195 A1 | 7/2013 | Carlson et al. |
| 2013/0191213 A1 | 7/2013 | Beck et al. |
| 2013/0238413 A1 | 9/2013 | Carlson et al. |
| 2013/0262226 A1 | 10/2013 | LaChapelle et al. |
| 2013/0282438 A1 | 10/2013 | Hunter et al. |
| 2013/0282589 A1 | 10/2013 | Shoup et al. |
| 2013/0304576 A1 | 11/2013 | Berland et al. |
| 2014/0244352 A1 | 8/2014 | Fordyce, III et al. |
| 2014/0310086 A1 | 10/2014 | Fordyce et al. |
| 2014/0337089 A1 | 11/2014 | Tavares |
| 2014/0344068 A1 | 11/2014 | Fordyce, III et al. |
| 2014/0351048 A1 | 11/2014 | Fordyce et al. |
| 2014/0365301 A1 | 12/2014 | Rappoport et al. |
| 2015/0058108 A1 | 2/2015 | Winters et al. |
| 2015/0287077 A1 | 10/2015 | Celikyilmaz et al. |
| 2016/0217446 A1 | 7/2016 | Fordyce, III et al. |

FOREIGN PATENT DOCUMENTS

| | | |
|---|---|---|
| JP | 2001175761 | 6/2001 |
| JP | 2003108897 | 4/2003 |
| JP | 2006301866 | 11/2006 |
| JP | 2007102340 | 4/2007 |
| JP | 2007317209 | 12/2007 |
| KR | 1020000037128 | 7/2000 |
| KR | 20020074271 | 9/2002 |
| KR | 20030080797 | 10/2003 |
| KR | 20040040253 | 5/2004 |
| KR | 20040107715 | 12/2004 |
| KR | 1020050024746 | 3/2005 |
| KR | 1020070043329 | 4/2005 |
| KR | 20050078135 | 8/2005 |
| KR | 20050089523 | 9/2005 |
| KR | 10-2005-0099707 | * 10/2005 |
| KR | 102005009970 A1 | * 10/2005 |
| KR | 20060034983 | 4/2006 |
| KR | 20060095895 | 9/2006 |
| KR | 20070030415 | 3/2007 |
| KR | 20070070588 | 7/2007 |
| KR | 20070075986 | 7/2007 |
| KR | 100761398 | 9/2007 |
| KR | 20070088955 | 12/2007 |
| KR | 20080104398 | 12/2008 |
| KR | 100883700 | 2/2009 |
| KR | 1020090016353 | 2/2009 |
| KR | 1020090059922 | 6/2009 |
| WO | 1999022328 | 5/1999 |
| WO | 1999026176 | 5/1999 |
| WO | 1999050775 | 10/1999 |
| WO | 2000060435 | 10/2000 |
| WO | 2000062231 | 10/2000 |
| WO | 2001037183 | 5/2001 |
| WO | 2001039023 | 5/2001 |
| WO | 2001050445 | 7/2001 |
| WO | 2001057758 | 8/2001 |
| WO | 2001086378 | 11/2001 |
| WO | 2001093161 | 12/2001 |
| WO | 2002005116 | 1/2002 |

(56) References Cited

FOREIGN PATENT DOCUMENTS

| WO | 2002014985 | 2/2002 |
|---|---|---|
| WO | 2002019229 | 3/2002 |
| WO | 2002042970 | 5/2002 |
| WO | 2002071187 | 9/2002 |
| WO | 2003025695 | 3/2003 |
| WO | 2003043333 | 5/2003 |
| WO | 2003081376 | 10/2003 |
| WO | 2005001631 | 1/2005 |
| WO | 2005031513 | 4/2005 |
| WO | 2005076181 | 8/2005 |
| WO | 2006028739 | 3/2006 |
| WO | 2006126205 | 11/2006 |
| WO | 2007131258 | 11/2007 |
| WO | 2007136221 | 11/2007 |
| WO | 2008013945 | 1/2008 |
| WO | 2008023912 | 2/2008 |
| WO | 2008028154 | 3/2008 |
| WO | 2008052073 | 5/2008 |
| WO | 2008055217 | 5/2008 |
| WO | 2008064343 | 5/2008 |
| WO | 2008067543 | 6/2008 |
| WO | 2008121286 | 10/2008 |
| WO | 2008144643 | 11/2008 |
| WO | 2009105300 | 8/2009 |
| WO | 2010017247 | 2/2010 |
| WO | 2010141270 | 12/2010 |
| WO | 2011017613 | 2/2011 |
| WO | 2011044137 | 4/2011 |
| WO | 2012075643 | 6/2012 |

OTHER PUBLICATIONS

International Patent Application PCT/US2011/037769, International Search Report and Written Opinion, dated Janaury 9, 2012.
International Patent Application PCT/US2009/052766, International Search Report and Written Opinion, dated Mar. 11, 2010.
International Patent Application PCT/US2010/036076, International Search Report & Written Opinion, dated Dec. 30, 2010.
International Patent Application PCT/US2010/043440, International Search Report and Written Opinion, dated Feb. 24, 2011.
International Patent Application PCT/US2010/044449, International Search Report and Written Opinion, dated Mar. 14, 2011.
International Patent Application PCT/US2010/044459, International Search Report and Written Opinion, dated Mar. 28, 2011.
International Patent Application PCT/US2010/044706, International Search Report and Written Opinion, dated Mar. 25, 2011.
International Patent Application PCT/US2010/044779, International Search Report and Written Opinion, dated Mar. 31, 2011.
International Patent Application PCT/US2010/044786, International Seach Report and Written Opinion, dated Mar. 17, 2011.
International Patent Application PCT/US2010/045082, International Search Report and Written Opinion, dated Feb. 28, 2011.
International Patent Application PCT/US2010/050504, International Seach Report and Written Opinion, dated Apr. 21, 2011.
International Patent Application PCT/US2010/050923, International Seach Report and Written Opinion, dated Apr. 26, 2011.
International Patent Application PCT/US2010/051262, International Seach Report and Written Opinion, dated May 30, 2011.
International Patent Application PCT/US2010/051490, International Seach Report and Written Opinion, dated Apr. 21, 2011.
International Patent Application PCT/US2010/051853, International Seach Report and Written Opinion, dated Jun. 21, 2011.
International Patent Application PCT/US2010/052070, International Search Report and Written Opinion, dated May 31, 2011.
International Patent Application PCT/US2010/053061, International Search Report and Written Opinion, dated May 30, 2011.
Li, Wen-Syan, "Knowledge Gathering and Matching in Heterogeneous Databases," Working Notes of the AAAI Spring Symposium on Information Gathering, pp. 116-1216, Mar. 27, 1995.
Mielikainen, Taneli, "Privacy Problems with Anonymized Transaction Databases," 7th International Conference on Discovery Science, pp. 219-229, Oct. 2, 2004.
Punj, Girish et al. "Cluster Analysis in Marketing Research: Review and Suggestions for Application," Journal of Marketing Research, vol. 20, pp. 134-148, May 1983.
Van Grove, Jennifer, "Are Your Online Video Ads Driving Actual Offline Purchases?", available at http://mashable.com/2009/05/18/video-impact/#, May 18, 2009.
International Patent Application PCT/US12/22417, International Search Report and Written Opinion, dated Aug. 9, 2012.
"Google ad words Tacking Codes" Measuring Your Profits, AdWords Help, Google Corporation, Book excerpt pp. 1-2. Available: http://support.google.com/adwords/bin/answer.py?hl=en&answer=2404207&from=146309&rd=1.
"Loyalty Solutions—Issuing Rewards Services" 2008, First Data Corporation. Available at http://www.firstdata.com/downloads/marketing-fs/fd_issuingrewards_ss.pdf.
Carini, Robert, "Oracle's Complete Sell-Side E-Commerce Solution," Apr. 30, 2008, 20 pages, available at http://www.oracle.com/us/products/applications/siebel/self-service-ebilling/038547.pdf.
Georgiadis, Margo et al., "Smart data, smart decisions, smart profits: the retailer's advantage," 22 pages, Feb. 8, 2005. Available at http://web.archive.org/web/20050208141921/http://www.mckinsey.com/practices/retail/knowledge/articles/smartdatasmartdecisions.pdf.
Google ad words Tracking Codes"—Measuring Your Profits, AdWords Help. Google Corporation—Book Excerpt, pp. 1-2. Retrieved from the Internet by Third Party Jun. 20, 2011: <URL: href="http://adwords.google.com/supportlawlbin/answer.py?hl=en& answer=146309.
International Patent Application PCT/US2012/034283, International Search Report and Written Opinion, dated Nov. 1, 2012.
International Patent Application PCT/US2012/031171, International Search Report and Written Opinion, dated Oct. 12, 2012.
Black Box Network Services, definition of "Recency," available at http://www.blackbox.com/resources/tools/microsites/digital-signage/what/glossary.aspx.
Webster's online dictionary definition of "recentness," available at http://lionreference.chadwyck.com/searchRefShelf.do;sessionid=E3EEA0C3CC5675F69170C8D24C140396.
WIC, Dec. 21, 2010.
WIC EBT Imp Guide, Oct. 22, 2010.
Android, by Sarah Perez, Aug. 6, 2010.
Bump, General FAQ's Feb. 8, 2011.
Facebook, Feb. 8, 2011.
Scotiabank Announces Its First All-in-One Card: Integrating Smart Chip Technologies' Loyalty with Credit, Debit, and Micropayments on a Single Smart Card/ PR Newswire [New York]Jul. 31, 2001: 1.
Shermach, Kelly. Coalition Loyalty Programs: Finding Strength in Numbers. Card Marketing 5.3 (Apr. 2001 ): 1, 12+.
CardSelect International Prepares for Launch of Customized Loyalty Platform for Credit Cards. Business Editors. Business Wire [New York] Apr. 5, 2001: 1.
"Discovering Statistics with SPSS" authored by Andy Field (first published by Sage Publications in 2000), Chapter 7—Factor Analysis—SPSS, published Jan. 21, 2009.
Factor Analysis Menu in SPSS, Aug 28, 2003, http://www.cs.uu.nl/docs/vakken/arm/SPSS/spss7.pdf.
Jackson, Communications of the Association for Information Systems (vol. 8, 2002) 267-296, e.g. p. 268 and 272.
Using Data Mining Techniques for Fraud Detection Solving Business Problems Using SAS® Enterprise Miner™ (1999) Software.
Accurately Measure the Offline Impact of Your Online Advertising Campaigns, Nielsen Net Effect Aug. 29, 2008, http://www.nielsen.com/content/dam/nielsen/en_us/documents/pdf/Fact%20Sheets/Nielsen%20NetEffect%20Fact%20Sheet.pdf.
Brewster et al., U.S. Appl. No. 09/475,884, entitled "Method of Target Advertising on a Document Printed as Part of an Electronic Transaction Using a Transaction Processing Center", filed Dec. 30, 1999.
Information Sciences Institute, University of Southern California, 'Internet Protocol—DARPA Internet Program Protocol Specifica-

(56) References Cited

OTHER PUBLICATIONS tion', Sep. 1981. [Retrieved from the Internet on Jan. 20, 2016] <URL: https://tools.ietf.org/rfc/rfc791.txt>.
Nielsen Net Effect Aug. 29, 2008 published on Google Prior Art Finder http://www.nielsen.com/content/dam/nielsen/en_us/documents/pdf/Fact%20Sheets/Nielsen%20NetEffect%20Fact%20Sheet.pdf.
Title: Targeted Advertising by Payment Processor History of Cashless Acquired Merchant Transactions on Issued Consumer Account, U.S. Appl. No. 12/185,332, filed Aug. 4, 2008, Inventor(s): Rajasekaran Dhamodharan, Status: Appeal Brief (or Supplemental Brief) Entered and Forwarded to Examiner, Status Date: Jun. 3, 2014.
Title: Systems and Methods to Connect Information, U.S. Appl. No. 13/889,966, filed May 8, 2013, Inventor(s): Silvio Tavares, Status: Non Final Action, dated Aug. 26, 2015.
Title: Systems and Methods to Generate Offers Based on Transaction Data, U.S. Appl. No. 14/301,202, filed Jun. 10, 2014, Inventor(s): Douglas Rappoport, et al, Status: Docketed New Case—Ready for Examination, Status Date: Jul. 9, 2014.
Title: Systems and Methods to Process Offers Based on Merchant Hierarchies, U.S. Appl. No. 14/312,228, filed Jun. 23, 2014, Inventor(s): Ilker Celikyilmaz, et al, Status: Docketed New Case—Ready for Examination, Status Date: Feb. 24, 2015.
Title: Successive Offer Communications with an Offer Recipient, U.S. Appl. No. 12/510,167, filed Jul. 27, 2009, Inventor(s): James VonDerheide, Status: Non Final Action, dated Mar. 25, 2014.
Title: Systems and Methods for Propensity Analysis and Validation, U.S. Appl. No. 12/851,138, filed Aug. 5, 2010, Inventor(s): Peter Ciurea, Status: Final Rejection, dated Jan. 28, 2015.
Title: Systems and Methods to Provide Loyalty Programs, U.S. Appl. No. 12/896,632, filed Oct. 1, 2010, Inventor(s): Edward Fordyce, et al, Status: Docketed New Case—Ready for Examination, Status Date: Mar. 19, 2015.
Title: Systems and Methods to Provide Loyalty Programs, U.S. Appl. No. 14/313,795, filed Jun. 24, 2014, Inventor(s): Edward Fordyce, et al, Status: Docketed New Case—Ready for Examination, Status Date: Aug. 6, 2015.
Title: Systems and Methods for Panel Enhancement with Transaction Data, U.S. Appl. No. 12849,785, filed Aug. 3, 2010, Inventor(s): Edward Fordyce, et al, Status: Abandned—Failure to Respond to an Office Action, dated Sep. 29, 2013.
Title: Systems and Methods for Panel Enhancement with Transaction Data, U.S. Appl. No. 13/277,159, filed Oct. 19, 2011, Inventor(s): Edward Fordyce, et al, Status: Docketed New Case—Ready for Examination, dated Apr. 16, 2014.
Title: Systems and Methods to Aggregate Demand, U.S. Appl. No. 12/900,440, filed Oct. 7, 2010, Inventor(s): Michelle Winters, et al, Status: Publications—Issue Fee Payment Received, Status Date: Oct. 17, 2014.
Title: Systems and Methods to Aggregate Demand, U.S. Appl. No. 14/529,813, filed Oct. 31, 2014, Inventor(s): Michelle Winters, et al, Status: Docketed New Case—Ready For Examination, Status Date: Nov. 25, 2014.
Title: Systems and Methods to Provide Intelligent Analytics to Cardholders and Merchants, U.S. Appl. No. 12/905,954, filed Oct. 15, 2010, Inventors(s): Edward Fordyce, et al, Status: Non Final Action, dated Sep. 30, 2014.
Title: Systems and Methods to Provide Intelligent Analytics to Cardholders and Merchants, U.S. Appl. No. 14/267,143, filed May 1, 2014, Inventors(s): Edward Fordyce, et al, Status: Docketed New Case—Ready for Examination, Status Date: May 20, 2014.
Title: Systems and Methods for Closing the Loop Between Online Activities and Offline Purchases, U.S. Appl. No. 12/849,789, filed Aug. 3, 2010, Inventors(s): Edward Fordyce, et al, Status: Non Final Action, dated Apr. 15, 2016.

Title: Systems and Methods for Closing the Loop Between Online Activities and Offline Purchases, U.S. Appl. No. 13/221,632, filed Aug. 30, 2011, Inventors(s): Edward Fordyce, et al, U.S. Pat. No. 8,626,579, Issue Date: Jan. 7, 2014.
Title: Systems and Methods to Deliver Targeted Advertisements to Audience, U.S. Appl. No. 12,849,791, filed Aug. 3, 2010, Inventors(s): Edward Fordyce, et al, Status: Non Final Office Action, dated Sep. 30, 2014.
Title: Systems and Methods to Deliver Targeted Advertisements to Audience, U.S. Appl. No. 13/221,750, filed Aug. 30, 2011, Inventors(s): Edward Fordyce, et al, U.S. Appl. No. 8,606,630, Issue Date: Dec. 10, 2013.
Title: Systems and Methods to Deliver Targeted Advertisements to Audience, U.S. Appl. No. 15/091,464, Inventors(s): Edward Fordyce, et al, Status: Application Undergoing Preexam Processing, Status Date: Apr. 5, 2016.
Title: Systems and Methods for Advertising Services Based on a Local Profile, U.S. Appl. No. 12/877,015, filed Sep. 7, 2010, Inventors(s): Leigh Amaro, et al, Status: Non Final Action, dated Sep. 1, 2015.
Title: Systems and Methods for Targeted Advertisement Delivery, U.S. Appl. No. 12/849,793, filed Aug. 3, 2010, Inventors(s): Edward Fordyce, et al, Status: Non Final Action, dated Sep. 2, 2015.
Title: Systems and Methods for Targeted Advertisement Delivery, U.S. Appl. No. 13/221,745, filed Aug. 30, 2011, Inventor(s): Edward Fordyce, et al, U.S. Pat. No. 8,744,906, Issue Date: Jun. 3, 2014.
Title: Systems and Methods for Targeted Advertisement Delivery, U.S. Appl. No. 14/447,529, filed Jul. 30, 2014, Inventors(s): Edward Fordyce, et al, Status: Docketed New Case—Ready for Examination, Status Date: Feb. 8, 2016.
Title: Systems and Methods for Anticipatory Advertisement Delivery, U.S. Appl. No. 12/876,868, filed Sep. 7, 2010, Inventors(s): Edward Fordyce, et al, Status: Non Final Action, dated Sep. 9, 2015.
Title: Systems and Methods for Advertising Services Based on an Sku-level Profile, U.S. Appl. No. 12/899,144, filed Oct. 6, 2010, Inventors(s): Edward Fordyce, et al, Status: Docketed New Case—Ready for Examination, Status Date: Oct. 20, 2015.
Title: Transaction Aggregator for Closed Processing, U.S. Appl. No. 12/832,699, filed Jul. 8, 2010, Inventors(s): Melyssa Barrett, et al, U.S. Pat. No. 8,626,705, Issue Date: Jan. 7, 2014.
Title: Systems and Methods to Match Identifiers, U.S. Appl. No. 12/849,798, filed Aug. 3, 2010, Inventor(s): Edward Fordyce, et al, U.S. Pat. No. 8,595,058, Issue Date: Nov. 26, 2013.
Title: Systems and Methods to Match Identifiers, U.S. Appl. No. 13/277,165, filed Oct. 19, 2011, Inventors(s): Edward Fordyce, et al, U.S. Pat. No. 8,843,391, Issue Date: Sep. 23, 2014.
Title: Systems and Methods to Match Identifiers, U.S. Appl. No. 14/458,754, filed Aug. 13, 2014, Inventors(s): Edward Fordyce, et al, Status: Prosecution Suspended, Status Date: Nov. 3, 2015.
Title: System and Method for Promotion Processing and Authorization, U.S. Appl. No. 12/778,485, filed May 12, 2010, Inventor(s): Jeffrey Perlman, et al, U.S. Appl. No. 8,676,639, Issue Date: Mar. 18, 2014.
Title: Systems and Methods for Multi-channel Offer Redemption, U.S. Appl. No. 12/849,801, filed Aug. 3, 2010, Inventor(s): John MacIlwaine, et al, Status: Examiner's Answer to Appeal Brief dated Feb. 29, 2016.
Title: Systems and Methods for Redemption of Offers, U.S. Appl. No. 13/113,710, filed May 23, 2011, Inventor(s): Karen Cervenka, et al, Status: Non Final Action dated Oct. 19, 2015.
Title: Systems and Methods to Facilitate Loyalty Reward Transactions, U.S. Appl. No. 13/356,506, filed Jan. 23, 2012, Inventor(s): Shantnu Singh, et al, Status: Non Final Action dated Jan. 8, 2016.
Title: Universal Loyalty Program Device, U.S. Appl. No. 13/432,249, filed Mar. 28, 2012, Inventor(s): Jeremy Black, Status: Non Final Action dated Feb. 11, 2015.
Title: Systems and Methods to Facilitate Offer Sharing, U.S. Appl. No. 13/396,536, filed Feb. 14, 2012, Inventor(s): Leigh Amaro, et al, Status: Docketed New Case—Ready for Examination, Status Date: Jan. 8, 2016.

\* cited by examiner

SUCCESSIVE OFFER COMMUNICATIONS WITH AN OFFER RECIPIENT

CROSS-REFERENCE TO RELATED APPLICATIONS

The present application is a continuation application of U.S. patent application Ser. No. 12/510,167, entitled "Successive Offer Communications with an Offer Recipient" and published as U.S. Patent Application Pub. No. 2011-0022424, the disclosure of which application is incorporated herein by reference in its entirety.

FIELD

Implementations generally relate to communicating data about an offer to incentivize a transaction, and more particularly, to successively communicating data about an offer of a merchant to an offer recipient in order to incentivize a subsequent transaction between the offer recipient and the merchant.

BACKGROUND

Merchants spend a considerable amount of money on research about consumer purchasing trends in order to better target their marketing efforts to potential consumers. In the U.S.A., for example, merchants may pay thousands of dollars for consumer demographic data as well as Nielsen Media Research® ratings of television viewing behavior of consumers in order to target the dissemination of their respective television advertisements. Similarly, merchants may pay for analysis of data about computer users' click paths' which are reflective of Wide Web browsing habits and patterns, in order to target their respective Internet advertisements.

The relevancy of the merchants' marketing efforts is directly dependent on the respective context in which they are made. For example, an advertisement about a retirement plan will have greater success in enticing a television viewer to becoming a member of the retirement plan if it is displayed on a television channel geared for adult viewers rather than if it was displayed on a children's television network.

Unfortunately, even if marketing efforts are well tailored, they may not be timely delivered. For example, the consumer may not be able to act upon an impulse to make a purchase at the time of receiving a marketing coupon such as when the consumer receives a merchant's coupon in a newspaper, where the coupon is intended for in-store use. A typical problem with such marketing models is that, though initially the consumer's intent to act upon the coupon may be high, the consumer have may forget about the merchant's newspaper coupon shortly thereafter due to the length of time between the consumer's viewing of the newspaper coupon and the consumer's subsequent shopping trip. Consequently, the merchant's marketing efforts may be ineffective at facilitating a subsequent transaction between the consumer and the merchant.

Accordingly, it would be an advance in the art of commerce to provide timely and well tailored offer communications to facilitate subsequent transactions.

SUMMARY

In one implementation, both an offer and a corresponding announcement about the offer are sent to a consumer. In this implementation, a transmission is received from a point of interaction (POI) terminal within a transaction processing system. The transmission includes information about a hard copy capability of the POI terminal and a Globally Unique IDentifier (GUID) of a consumer to whom an issuer has issued an account within the transaction processing system. An offer of a merchant is retrieved and sent to the POI terminal for rendering as a hard copy of a receipt. At a predetermined time thereafter, the GUID is used to retrieve an announcement about the offer that is sent to a mobile electronic device of the consumer for rendering as a soft copy.

In another implementation, each of an offer of a first merchant, a corresponding announcement about the offer, and data about a reward corresponding to a transaction with the first merchant is sent to a consumer. To do so, an offer of the first merchant is retrieved and sent to a POI terminal for rendering as a hard copy of a receipt of a second merchant. At a predetermined time thereafter, an announcement about the offer is retrieved and sent to a mobile electronic device of the consumer for rendering as a soft copy. A confirmation that the consumer conducted a transaction with the first merchant is received and data about a reward corresponding to the confirmation is sent for rending as a soft copy upon the mobile electronic device of the consumer.

In yet another implementation, an apparatus includes a computer readable medium having stored instructions. When the instructions are executed, data is received from a point of interaction (POI) terminal that is communicatively connected to a transaction processing system. The data includes a hard copy capability of the POI terminal and a GUID of a consumer to whom an issuer has issued an account within the transaction processing system. An offer of a merchant is retrieved and sent to the POI terminal for rendering as a hard copy. At a predetermined time thereafter, the GUID is used to retrieve an announcement about the offer that is sent to a mobile electronic device of the consumer for rendering as a soft copy.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Consumers purchase resources, such goods and/or services, from merchants by engaging in transactions, with the corresponding merchants. The transactions or "purchases" may be sales, leases, rentals, assignments, and/or licenses of the resources, where some form of currency (e.g., money, "points" in a loyalty program, or minutes for cellular telephony air time usage) is given by the corresponding consumers to the corresponding merchants in exchange for the respective resources. Alternatively, the transactions may be gratuitous, such as donations to charitable organizations, where the consumers are the donors and the charitable organizations are the merchants receiving the corresponding donations. The transactions may be cashless such that currency is transferred from the consumers to the respective merchants through the use of corresponding accounts of the consumers, such as accounts issued to the corresponding consumers by corresponding issuers within a transaction processing system. Each consumer may be a person, an entity, or a group of persons or entities. Similarly, each merchant may be, for example, a retailer, a wholesaler, a reseller, a manufacturer, a broker, a distributor, a provider, a charitable organization, or any entity in the distribution chain of resources. In a business-to-business environment, a first merchant may engaged in the transaction with one of the consumers that is a second merchant, such as a small business to whom the first merchant is a supplier of resources.

Methods, apparatuses, systems, and networks for providing successive offer communications to consumers (e.g., "offer recipients") are disclosed. An offer recipient receives a first offer communication including an offer for a resource of an offering merchant and receives a subsequent, second offer communication about the same resource of the offering merchant. The first and second offer communications are each formatted to be rendered by respective communication devices, such as a mobile phone of the offer recipient or a Point of Interaction (POI) terminal (e.g., a Point of Sale terminal) of a second merchant that may be different from the offering merchant. The content of the offer communication(s) may be tailored to the offer recipient based on, for example, a function of characteristics of the offer recipients, such as: an age of the offer recipient, the offer recipients' corresponding transaction data (e.g., a history of past transactions made payable upon accounts of one of the offer recipients), or a real time geographical location of the offer recipient. Therefore, some implementations allow for timely successive communications of offers that are tailored to consumers as offer recipients.

Figure 1:
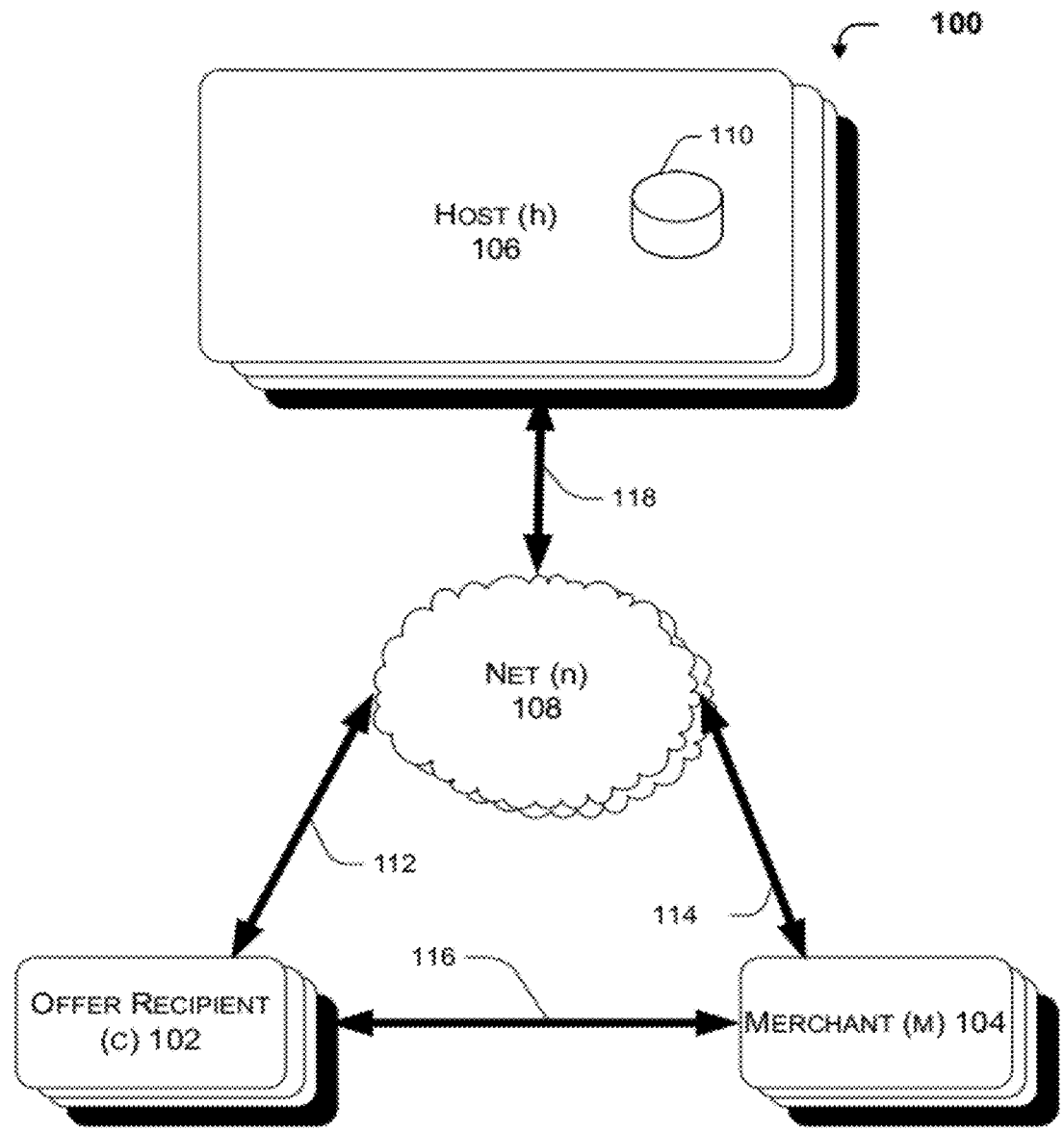
FIG. 1 depicts a block diagram illustrating an exemplary environment in which an offer recipient receives at least one offer.

Referring to FIG. 1, a block diagram illustrates an exemplary environment in which an offer recipient receives at least one offer communication from a merchant within an offer system 100. The offer system 100 includes: (i) at least one offer recipient (o) 102 (e.g., at least one consumer that receives an offer communication) such as offer recipient (1) 102 through offer recipient (O) 102, where "O" can be up to and greater than an eight digit integer; (ii) at least one merchant (m) 104 (e.g., the merchant) such as merchant (1) 104 through merchant (M) 104, where "M" can be up to and greater than an eight digit integer; (iii) and at least one host (h) 106 such as host (1) 106 through host (H) 106, where "H" can be up to and greater than an eight digit integer (collectively "users").

The host (h) 106 may be an entity that utilizes a special purpose computer to receive data, transmit data, store data, or execute algorithms (e.g., software). Host (h) 106 can operate the special purpose computer, for example: (i) to select the offer recipient (o) 102; (ii) to determine the content, timing of offer communication(s) to be sent to an offer recipient (o) 102; (iii) to determine the rendering capabilities of a recipient device to which the offer communication(s) are sent for delivery to the offer recipient (o) 102; (iv) etc. The host (h) 106 may also use the special purpose computer to algorithmically compare received data stored data to find a match. When a match is found, the computer can be operated to transmit the offer to a selected offer recipient (1) 102. To illustrate, the host (1) 106 may utilize a special purpose computer to execute the algorithm to determine if received data about a current transaction of the offer recipient (1) 102 satisfies a stored offer condition of the offer. If the offer condition is satisfied, the host (h) 106 may, in turn, facilitate the transmission (e.g., transmitting or broadcasting) of a corresponding offer communication to the offer recipient (1) 102. The transmission may be for delivery to a mobile device of the offer recipient (1) 102 or the POI terminal of the merchant (1) 104 that is co-located with the offer recipient (1) 102, or another communication device as would be known by those of ordinary skill in the art.

The offer system 100 may have at least one database DB 110. As appreciated by those skilled in the art, the DB 110 or components thereof may be any combination of databases, or the components thereof, in a single location or in multiple locations that are in mutual communication via a network. Data stored in the DB 110 may be structured by a database model, such as a relational model or a hierarchical model, where the model may govern how the data stored in the DB 110 may be accessed. For example, query languages can be used to query the data stored in the DB 110 to locate records, or portions thereof, that are relevant to the query. The DB 110 may include any of a variety of security features such as: access codes, firewalls, compression, decompression, encryption, de-encryption, or the like.

In some implementations, the data stored in the DB 110 may include information about the users of the offer system 100, their respective communication devices, or past interactions of the users with the offer system 100. The information about the users may include: (i) consumers; (ii) the offer recipients 102; (iii) the merchants 104; (iv) the hosts 106; (vi) capabilities of communication devices within the offer system 100; (vii) the communication channels within the offer system 100; (vii) etc. For example, the data stored in the DB 110 may include: (i) a profile created by the user; (ii) information purchased from external sources who supply such information; (iii) hard copy or soft copy capabilities of communication devices within the offer system 100; (iv) a transmission specification of a particular communication channel; (v) transaction data about transactions between one or more consumers and the merchant (m) 104; (vi) etc. A user profile of the merchant (m) 104 may include a merchant category of the merchant (m) 104, or a merchant identifier of the merchant (m) 104. The information purchased from an external source may include a Fair Isaac Corporation (FICO) score of the offer recipient (o) 102. A transmission specification of the particular communication channel may include the speed of transmission (e.g., baud rate) or a security feature of the particular communication channel. The transaction data may include data about transactions upon the accounts of corresponding consumers with corresponding merchants 104. The transaction data may include analyses based on the past transactions of the consumers, such as trends, patterns, or segmentation of the past transactions.

The transaction data may have been stored in the DB 110 in real time or not in real time. In one implementation, the transaction data may have been stored during the real time processing of the corresponding transactions within a transaction processing system in communication or integrated with the offer system 100. In another implementation, the transactions may not have been stored in real time, such as by storing a plurality of past transactions in batch mode in the DB 110.

Each user of offer system 100 may be communicatively connected to at least one network Net (n) 108 such as Net (1)

108 through Net (N) 108, where "N" can be up to and greater than an eight digit integer. Each Net (n) 108 may represent any of a variety of suitable means for exchanging data, such as: the Internet, an intranet, an extranet, a wide area network (WAN), a local area network (LAN), a virtual private network, a satellite communications network, an Automatic Teller Machine (ATM) network, an interactive television network, or any combination of the forgoing. For example, the offer recipient (o) 102 may be connected to the host (h) 106 via Net (n) 108 (e.g., a satellite communication network), while the merchant (m) 104 may be connected to the host (h) 106 via Net (2) 108 (e.g., the Internet). Data flows between users of the offer system 100 through their respective connections to one or more network devices (e.g., Net (n) 108)) that are networked within the network Net (n) 108 in the offer system 100.

The Net (n) 108 may contain either or both wired or wireless connections for the transmission of signals including electrical connections, magnetic connections, or a combination thereof. Examples of such connections are known in the art and include: radio frequency connections, optical connections, etc. To illustrate, the connection for the transmission of signals may be a telephone link, a Digital Subscriber Line, or cable link. Moreover, Net (n) 108 may utilize any of a variety of communication protocols, such as Transmission Control Protocol/Internet Protocol (TCP/IP), for example.

The offer system 100 may include various communication channels. For example, offer recipient (o) 102 may communicate with: the merchant (m) 104 via a channel 116 or the host (h) 106 via channel 112, the Net (n) 108, and a channel 118. Each communication channel in FIG. 1 is shown as a double arrow representing a plurality of signals and bidirectional communication channels. For example, the merchant (m) 104 may transmit data to the Net (1) 108 via channel 114 and receive data back from Net (2) 108 via another channel 114.

Each Net (n) 108 may connect one or more users via corresponding respective communication devices. Each of the communication devices may have a processing unit operatively connected to a display and memory such as Random Access Memory ("RAM") and/or Read-Only Memory ("ROM"). The respective communication devices may each include a combination of hardware and software that enables an input or output device such as a keyboard, a mouse, a stylus and touch screen, a printer, or the like. Examples of communication devices include: a mobile telephone; a personal digital assistant; an intercommunication system device of the merchant (m) 104; a computer terminal of either the offer recipient (o) 102 or the merchant (m) 104; a television display of the merchant (m) 104; a POI terminal; or any other device capable of rendering the offer communication, such as a soft copy or hard copy of the offer communication. The POI terminal can be a physical or virtual communication vehicle that provides the opportunity, through any channel (e.g., channels 112, 114, 116, or 118) to engage with the offer recipient (o) 102 or the host (h) 106 for the purposes of providing content, messaging or other communication, related directly or indirectly to the facilitation or execution of a transaction between the merchant (m) 104 and the offer recipient (o) 102. Examples of the POI terminal include: a physical or virtual Point of Service (POS) terminal, a portable digital assistant, a cellular telephone, a computer capable of rendering audio offers, visual offers, and/or multimedia offers. Example offer renderings include formats such as e-mails, Internet web pages rendered via a browser executing on a computing device, or a combination of the forgoing.

The communication device may have various capabilities for receiving, storing, executing an algorithm, or outputting data, for example, through the use of a microprocessor, a programmable memory, or a transponder (e.g., transmitter or receiver). The transponder may have near field (e.g., "Blue Tooth" communication wireless protocol for exchanging data over short distances from fixed and mobile devices) or far field communication capabilities (e.g., satellite communication or communication to cell sites of a cellular network) for telephony or data transfer such as communication with a global positioning system (GPS). The algorithm of the communication device may support a number of services such as: Short Message Service (SMS) for text messaging, Multimedia Messaging Service (MMS) for transfer of photographs and videos, electronic mail (e-mail) access, hard copy capabilities, or soft copy capabilities.

The communication device may have hard copy capabilities, such as a capability of a POS terminal to print a receipt for a transaction. The communication device may have, for example, a thermal printer that produces a printed image upon coated thermochromic paper by selectively heating portions of the thermochromic paper over a thermal print head, such as one that has a heating resistor. The thermal print head may produce various temperatures that manifest black and white and/or color hard copies. Other forms of hard copy capabilities include: dot matrix printing, ink jet printing, laser printing, dye-sublimation printing, photocopying, digital pressing, Braille printing or other means for producing a hard copy as is known by those of ordinary skill in the art. Examples of communication devices with hard copy capabilities include: an information kiosk, a cash register, a petroleum pump station, a facsimile machine, a voucher printer, or a computer that is linked to a printer.

The communication device may have soft copy capabilities, such as the ability to produce a digital file that is rendered on an electronic display or played on an audio speaker through the execution of a text, image, or sound processing program, for example. To illustrate, the offer recipient (o) 102 may have a Portable Consumer Device (PCD), such as a mobile telephone, that has hardware and a computer readable medium having software that, when executed, renders a digital file as an image upon an Liquid Crystal Display (LCD). The computer readable medium of the PCD, such as a magnetic stripe or a memory of a chip or a chipset, may include a volatile, a non-volatile, a read only, or a programmable memory that stores data, such as an account identifier, a consumer identifier, and/or an expiration date for the account associated with the account identifier. Examples of PCD's that have soft copy capabilities include: a smart payment card, a pager, a cellular telephone, a personal digital assistant, a digital audio player, a computer (e.g., laptop computer), a set-top box, a portable workstation, a minicomputer, or a combination thereof.

In one implementation, the offer system 100 can include, or be included within, a transaction processing system having a plurality of financial institutions (e.g., banks, credit unions, savings and loan institutions, or brokerages, etc.) and at least one transaction handler, where users of the offer system 100 can include: the transaction handler, at least one financial institution (e.g., a bank, a credit union, an issuer of a transaction payment account to the consumer, etc.), the consumer (e.g., offer recipient (o) 102), and the merchant (m) 104. Examples of transaction processing systems include VisaNet® network, the American Express® network and the Veriphone® network. See Infra *Exemplary Transaction Processing System*. In some implementations, the financial institution and/or the transaction handler may provide at least some of the functions of the host (h) 106.

Figure 2:
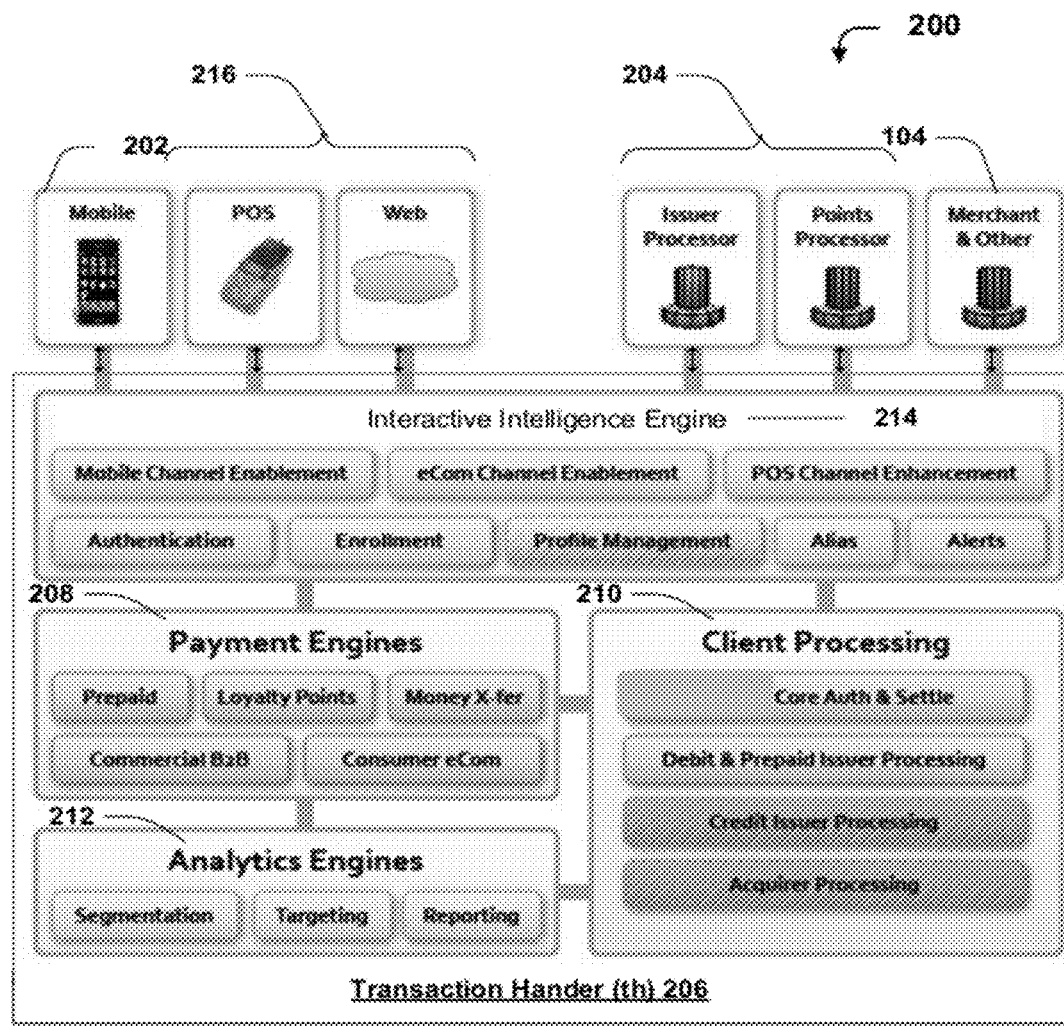
FIG. 2 depicts a block diagram illustrating an exemplary transaction processing and offer system that can be operated in the environment of FIG. 1.

Referring to FIG. 2, a block diagram illustrates an exemplary transaction processing and offer system 200 where the transaction processing system operates in the environment of the offer system 100. Here, transaction processing and offer system 200 includes the merchant (m) 104; the communication device 202 of the offer recipient (o) 102, depicted as a mobile device 202; the communication device 216 of the merchant (m) 104, depicted as the POS or web based POI 216; and the host (h) 106 that is represented by at least one transaction handler (th) 206 (e.g., the transaction handler) such as transaction handler (1) 206 through transaction handler (TH) 206, where the "TH" can be up to and greater than an eight digit integer.

The transaction handler (th) 206 may have various processing engines such as an interactive intelligence engine 214, a client processing engine 210, payment engines 208, and analytics engines 212, each of which may operate specific functionalities of the host (h) 106. Although shown in separate functional blocks in FIG. 2, other configurations are also possible, for example, the various processing engines may be combined as one engine or further segregated out as multiple engines.

The interactive intelligence engine 214 may receive data into, transmit data out of, and manage data within the transaction handler (th) 206. For example, the interactive intelligence engine 214 may execute algorithms that: enable mobile communication with various communication devices (e.g., the communication device 202 or the communication device 216); enable communication through the use of electronic commerce channels (e.g., channel 118 depicted in FIG. 1); enhance a POS Channel (e.g. channel 114 in FIG. 1) to facilitate receipt of transaction data for transitions upon accounts; or authenticate a user, such as the consumer, the offer recipient (o) 102 or the merchant (m) 104; enroll users of the transaction processing and offer system 200 (e.g., collects data from a profile created by the user and provides the user with access to the transaction and offer processing system 200); manage profiles; provide aliases for users of the transaction processing and offer system 200 (e.g., a pseudo-number for an account that is different from the Personal Account Number of the account); or provide alerts to the users, such as an alert about fraudulent use of the offer and transaction processing system 200.

The client processing engine 210 may operate logic for processing a transaction upon an account issued to the consumer (e.g., that may be a potential offer recipient (o) 102) by an issuer. For example, the client processing engine 210 may execute algorithms that: authorize and settle transactions (e.g., upon credit, debit, or charge accounts); process debit and prepaid account transactions; perform transaction processing typically conducted by a credit account issuer (e.g., a bank, a credit union, etc.); or perform transaction processing typically conducted by a merchant's acquirer.

The payment engines 208 may operate to transfer currency or other forms of value from one entity to another. For example, the payment engines 208 may execute algorithms that operate: prepaid payment processing, loyalty point calculation/disbursement, money transfer processes, commercial business-to-business payment processing, or consumer electronic commerce payment processing.

The analytics engines 212 may operate to calculate trends within the data accessible by the transaction handler (th) 206. The data accessible by the transaction handler (th) 206 may include: the data stored in the DB 110; the data received from an issuer processor, points processor 204; or data received from the merchant (m) 104, for example. The trend calculation may be done through execution of an algorithm that analyzes or mines the data accessible by the transaction handler (th) 206. Any conventional or predetermined algorithm for data analysis may be used to calculate the trend. As appreciated by those skilled in the art, the data analysis may be any of a data mining analysis such as Market Basket Analysis, a pattern recognition analysis, an optimization analysis, a statistical analysis, a demographic analysis, a segmentation analysis, or a combination thereof. To illustrate, the analytics engines 212 may use the predetermined algorithm to analyze the transaction data stored in the DB 110. An output of the analytics engines 212 may be a statistical trend showing that consumers who purchased school supplies in August for the last four years are likely to purchase school supplies this August. Also, general consumer trends may be analyzed to determine highly correlative events, such as "consumers who purchased shoes also buy socks within 90 days of a shoe purchase." Another function of the analytics engines 212 may be to render reports on the analyzed data, such as electronic or hard copy renderings of the analyzed data.

The calculated trends may be used to tailor the content of the offer communications to the offer recipient (o) 102. For example, the output of the analytics engines 212 may be a determination of the reach and frequency with which an offer needs to be communicated to a particular demographic group of consumers in order to motivate commercial behavior of those consumers to conduct future transactions upon their issued accounts within the transaction processing system. The calculated trend may then be used to tailor the content of the offer communications in order to make the offers more relevant to the respective consumers. For example, the content of the offer communication may be based on the frequency with which the consumer engages in transactions with the offering merchant (1) 104.

Within the offer and transaction processing system 200, the issuer processor and points processor 204 or the merchant (m) 104 may provide respective data (e.g., user profiles or transaction data for transactions upon accounts) or respective business rules to the transaction handler (th) 206. The transaction handler (th) 206, may in turn, utilize the received business rules to select the offer recipient (o) 102 or determine the offer condition of a corresponding offer. For example, the transaction handler (th) may compare received transaction data of the consumer to the offer condition to determine whether to send a corresponding offer communication to the consumer or to determine the timing, content, frequency, and venue for the rendering of the offer communication to the consumer that becomes one of the offer recipients (o) 102.

An algorithm can be used to operate upon data to make a determination as to whether an offer condition of an offer has been satisfied. In one implementation, the transaction handler (th) 206 may employ a software implementation of such algorithm executed by computing apparatus so as to access data stored in the DB 110 or in the transaction data associated with transactions as they are processed by the offer and transaction processing system 200.

The offer condition can be specified to include one or more criterion. The criterion can be the occurrence of a physical activity, the status of specific data, the existence of a particular state, a time period (e.g., during daylight hours), or a location within a spatial zone, for example. When the condition is satisfied, delivery of the offer to the offer recipient (o) 102 is triggered. For example, the criterion may include: the transaction handler (th) 206 receiving transaction data about one of the transactions between the offer recipient (I) 102 and the merchant (m) 104 from a corresponding acquirer of the merchant (m) 104; a predetermined demographic of the offer recipient (o) 102; a category of the account of the offer recipient (o) 102 (e.g., a Visa gold card, a Black American Express card, etc.); a window of time in which the offer is sent (e.g., sending the offer: during hours of operation of a shop of the merchant (m) 104, during the day, or during a lunch hour); a transaction history of one of the accounts of the offer recipient (o) 102, such as when a group of the transactions of the offer recipient (o) 102 shows a tendency to purchase a particular type of resource; a consumer's habit or tendency to purchase the resource of competitors of the merchant (m) 104; a seasonal trend in a purchasing behavior of the offer recipient (o) 102; a status of the communication device of the offer recipient (o) 102 (e.g., the consumer's cell phone is in a 'turned off' status or otherwise is not in communication with a cellular network); or a combination of the forgoing.

In one implementation, the offer condition may be selected based on the merchant's 104 business rule. The business rule may focus on the timing of the delivery of the offer communication, the relevance of the content of the offer communication to the activities of the offer recipient (o) 102, or the location of the offer recipient (o) 102 at the time the offer recipient (o) 102 is to receive the offer communication. The merchant (m) 104 may want to send the offer communication when the offer recipient (o) 102 is in "a shopping mood," and therefore, more receptive to making a purchase or engaging in a transaction. For example, if the merchant's (m) 104 business rule is "send my offer to the offer recipient (o) 102 when the offer recipient (o) 102 is in a shopping mall that includes one of my stores," then the corresponding offer condition may be for the offer recipient (o) 102 to be located within a predetermined spatial zone including the shopping mall. Here, the transaction handler (th) 206 may receive a signal including data about the real time location of the offer recipient (1) 102, such as a signal from a co-located cellular telephone of the offer recipient (1) 102, or a real time authorization request for a transaction between the offer recipient (1) 102 and the merchant (1) 104. The transaction handler (th) 206 may utilize the data in the received signal to determine the real time location of the offer recipient (1) 102, or compare the determined real time location of the offer recipient (1) 102 with a criterion of the offer condition to find a match (e.g., the offer recipient (1) 102 is located in the predetermined spatial zone). If a match is found, the offer communication is sent to the offer recipient (1) 102 within temporal proximity to finding the match (e.g., right after finding the match, within seconds or hours of finding the match). In this manner, the offer recipient (1) 102 may receive the offer communication while the offer recipient (1) 102 is still in the shopping mood such that the merchant's (m) 104 desired targeting goal is met.

To illustrate, the merchant (1) 104 may access the interactive intelligence engine 214 via a web enabled communication device 216. The transaction handler (th) 206 may first authenticate the merchant (1) 104 as one of the merchants 104 that has enrolled to have access to the offer and transaction processing system 200. The authenticated merchant (1) 104 may define a business rule for corresponding offers such as: "send repeat offers of 10% off on chairs to all gold card account holders that are shopping in my ZIP code." The transaction handler (th) 206 may create the offer conditions for the authenticated merchant's (1) 104 offers based on the received 'business rule', such as: (1) receipt of a real time transaction (e.g., "shopping" in the above 'business rule' example); (2) a real time transaction upon an account that has a Personal Account Number that is associated with a gold card account (e.g., "gold card account holder" in the above 'business rule' example) and; (3) where the real time transaction is received from a POI terminal that is known to be located within a predetermined geographic location (e.g., "my ZIP code" in the above 'business rule' example).

Subsequent to receiving the authenticated merchant's 104 business rules, the transaction handler (th) 206 may receive, in real time, an authorization request from the POS terminal 216 of a retailer for a transaction of a consumer purchasing a resource of the retailer that is located within the ZIP code of the merchant (1) 104. The transaction (th) 206 may compare the received real time transaction data within the authorization request to the offer conditions enumerated above to find respective matches. For example, the analytics engines 212 may run a matching algorithm that targets the consumer making the purchase as the offer recipient (1) 102. Moreover, the client processing engine 210 may authorize the transaction of the consumer, such as by sending an authorization response back to the POS terminal 216 of the retailer. The authorization response may have an approval for the transaction to be made payable upon the account of the consumer, the offer communication, and printing instructions for rending the corresponding offer on a paper receipt for the transaction between the retailer and the consumer that is the offer recipient (1) 102. The transaction handler (th) 206 may also send for a rendering of the corresponding offer to be sent to the consumer either while the consumer is co-located with the POS terminal 216 of the retailer or sometime thereafter. Such a rendering may be intended to be displayed upon a display of a mobile device 202 of the consumer, where the logical address of device 202 is stored in the DB 110. The analytics engines 212 may then create a report about the offers sent to the consumer (e.g., the offer recipient (1) 102) and the interactive intelligence engine 214 may send a transmission to the web enabled communication device 216 of the merchant (1) 104 where the report may be rendered, such as on a display of a computer of the merchant (1) 104 and/or on a hard copy that is printed out.

Figure 3:
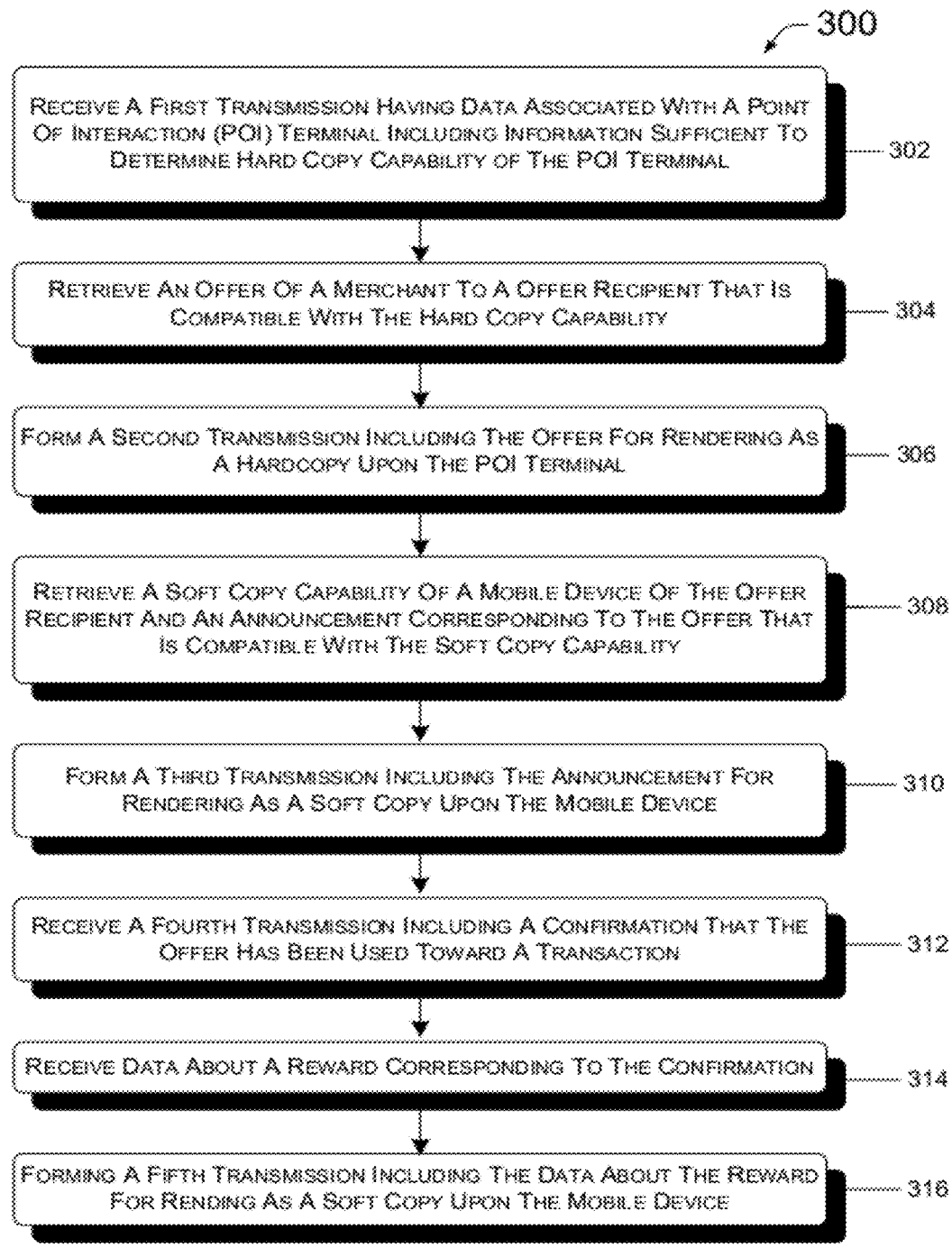
FIG. 3 depicts a flowchart of an exemplary method, that can be performed in the environment of FIG. 1, for a host to provide an offer to an offer recipient.

Referring to FIG. 3, a flowchart illustrates an exemplary method 300 providing successive offer communications about an offer of merchant (m) 104 to offer recipient (o) 102 within offer system 100 or offer and transaction processing system 200. In this implementation, the offer recipient (o) 102 receives two successive offer communications about the offer of the merchant (m) 104. The first communication includes the offer and may be rendered in hard copy format at a POI terminal; the second communication is an announcement about the offer, such as a reminder about the previously sent offer, that may be rendered in a soft copy format. Thereafter, a confirmation is received that the offer has been used toward a transaction with the merchant (m) 104. Data about a reward corresponding to the confirmation is retrieved and send to the offer recipient (o) 102. Here, for illustrative purposes only, the offer recipient (o) 102 is an account holder that has been issued an account by an issuer within the transaction processing system or the offer and transaction processing system 200. The offer recipient (o) 102 may have enrolled with the offer system 100 to receive from merchant (m) 104 any offers for which the offer recipient (o) 102 qualifies. Alternatively, the offer recipient (o) 102 may receive the offer of the merchant (m) 104 unsolicited, without enrolling with the offer system 100 to receive the merchant's (m) 104 offers.

At a step 302, a first transmission is received, including data about the account holder and data that is associated with a POI terminal. For example, the first transmission may include data that indicates that the account holder is interacting with the transaction processing and offer system 200 in order to access information about the account of the account holder or to request an application of a feature associated with the account (e.g., 24 hour concierge services for gold card members). To illustrate, the first transmission may be sent to the transaction processing and offer system 200 in order to: withdraw currency from the account, conduct a transaction upon the account, check on a balance of the account, transfer money from one account to another account, request a lodging upgrade, request a travel seating upgrade, request a restaurant seating upgrade, or request a preferential treatment.

The data about the account holder may include an identifier of the account holder that is globally unique (e.g., a 'GUID') within the offer system 100, the transaction processing system, or the transaction and offer processing system 200. For example, the GUID may be a Personal Account Number (PAN) of an account of the account holder, a hash of the PAN, a name of the account holder, an alphanumeric code unique to the account holder, an electronic recording of the voice of the account holder, a digital fingerprint of the account holder, or other means known to those of ordinary skill in the art to uniquely distinguish or identify the account holder within a system.

Moreover, the first transmission may include data about the POI terminal sufficient to determine a means to communicate with the account holder. As previously described, because the transaction processing system can operate in the offer system 100 environment, as shown in the transaction and offer processing system 200, the communication device (e.g., the POI terminal) in the transaction processing system becomes a means by which to provide the account holder with an offer communication. Consequently, in some implementations, the offer communication can be sent to the account holder at a moment when the account holder is accessing the account and is likely to be in a 'buying mood'. Here, the concept of a consumer's 'buying mood' may be understood to be a particular time period within which the consumer has made first purchase and is likely to make a second purchase if it is chronologically proximal to the first purchase.

The data that is associated with a POI terminal in the first transmission may include information sufficient to determine the hard copy capability of the POI terminal. For example, the first transmission may be an authorization request for a transaction between a first account holder and the merchant (I) 104, sent from the POI terminal of the merchant (1) 104 and received by the transaction handler (th) 206. The authorization request may include a merchant identifier for the merchant (1) 104.

The received merchant identifier may be sufficient to determine the hard copy capability. For example, the transaction handler (th) 206 may compare the received merchant identifier of the merchant (1) 104 to the merchant identifiers of corresponding respective merchants (1-*m*) 104 stored in the DB 110, which may be a relational database. The relational database may associate the corresponding hard copy capability of the respective POI terminal of each of the merchants (1-*m*) 104 with the corresponding merchant identifiers of the merchants (1-*m*) 104. If the transaction handler (th) 206 finds a match between the received merchant identifier and the merchant identifier of the merchant (1) 104 stored in the DB 110, then the hard copy capability of the merchant's (1) 104 POI terminal may be retrieved.

In another example, first transmission may be a currency withdrawal request of the consumer. The request may include a code identifying an ATM from which the currency is being withdrawn. The first transmission may be sent from the ATM machine and received by the transaction handler (th) 206. The transaction handler (th) 206 may compare the received code identifying the ATM with data about the ATM stored in the DB 110 to retrieve the ATM's hard copy capability. Exemplary data about the hard copy capabilities of the POI terminal (e.g., the ATM) that may be included in the first transmission are: a make and model of an ink jet printer, a font printing option, color options of a thermal printer, dimensions of a hard copy output of the POI terminal, white space availability or white space location on receipts rendered by the POI terminal, time or day availability for printing options of the POI terminal, or other functional hard copy features of the POI terminal.

At a step 304, an offer of the merchant (m) 104 is retrieved, such as by retrieving the offer from the DB 110. As previously described, business rules may provide for the offer condition(s) that guide the retrieval of the offer of the merchant (m) 104. For example, a business rule of the merchant (2) 104 for the merchant's (2) 104 offers may be: "send my offer to account holders that receive currency over the amount of $20 US as 'cash back' during a debit card transaction at a POI terminal of another merchant (1) 104." The transaction handler (th) 206 may compare the data received in the first transmission to the offer conditions of the above business rule to determine whether the account holder should be an offer recipient (o) 102 of the merchant's (2) 104 offer. Here, if the first transmission includes data indicating that the account holder is receiving $30 US as 'cash back', at a POI terminal of the merchant (1) 104, then the merchant's (2) 104 offer is retrieved from the DB 110.

The retrieved offer may be compatible, or may be made compatible with the hard copy capability of the POI terminal from which the first transmission was sent. In the above example, if the merchant's (2) 104 offer incorporates color graphs but the POI terminal hard copy capabilities only support black and white printing, then the data representing the merchant's (2) 104 offer may be augmented so as to render a black and white hard copy rather than a color copy of the merchant's (2) 104 offer. Alternatively, or in combination, the business rule for the offer may delineate the hard copy capability of the POI terminal as one of the offer conditions. To illustrate, one of the offer conditions of the merchant (2) 104's offer may be that the POI terminal hard copy capability includes color printing. Therefore, in this example, if the POI terminal does not support the above hard copy capability offer condition of color printing, then the merchant's (2) 104 offer will not be sent to the POI terminal as the offer condition has not be satisfied.

The content of the offer may be generic ("10% off any purchase at Joe's Restaurant") or customized to the account holder ("Sally, get your usual coffee order of a half caffeinated, half decaffeinated soy latte at Peet's Coffee & Tea™ shop for free if you make your purchase at Peet's Coffee & Tea™ shop on Fourth Street by 11:15 AM today.") As previously described, the customization of the offer may occur through algorithmic analysis of the transaction data of the account holder. For example, the analytics engines 212 may utilize the GUID of the account received in the first transmission to access the transaction data of past transactions of the account holder stored in the DB 110 to find at least one match. The matched data can then be analyzed for trends. In the above example, the matched data may show that Sally has utilized her account in the past for purchases at Peet's Coffee & Tea™ shop on Fourth Street. Moreover, if the past transactions with Peet's Coffee & Tea™ shop also included information about the purchased goods and/or services and that Sally previously bought (e.g., as indicted by Stock Keeping Unit, Universal Product Code, or other product descriptor) then a result of the analysis may also show repeated purchases of the same goods and/or services, here "a half caffeinated, half decaffeinated soy latte." The result may, in turn, affect the content of the offer, such as the offer made to Sally for her "usual coffee order of a half caffeinated, half decaffeinated soy latte."

Alternatively, or in combination, the customization of the offer may be based on the data received in the first transmission. For example, the first transmission may be an authorization request for a 'card present' transaction between the offer recipient (o) 102 and the merchant (5) 104. Here, the data received in the first transmission that could be used to customize the offer include: a name of the offer recipient, an amount of a purchase, a resource identifier of a resource that is being purchased (e.g., Universal Product Code), a date, a time of day, or a real time location of the offer recipient (o) 102 (e.g., based on a known physical location of the merchant (5) 104). In another example, the POI terminal may be an ATM from which the offer recipient (o) 102 may be withdrawing cash. Here, the first transmission may include a code from which a location of the ATM can be determined, and from which the real time location of the proximally located offer recipient (o) 102 can also be determined.

In some implementations, the content of the offer may be based on both the data stored in the DB 110 and the data included in the first transmission. Using the above two examples of the ATM and the Peet's Coffee & Tea™ shop, the physical addresses of each of the ATM and Peet's Coffee & Tea™ shop may be used to determine an expiration period for the offer or travel directions between the two locations. The corresponding physical addresses of each of the ATM and Peet's Coffee & Tea™ shop may have been retrieved and/or stored in the DB 110. These physical addresses may be used to target the offer content by limiting the offer duration to an approximation of the travel time from the ATM's physical address to Peet's Coffee & Tea™ shop's physical address (e.g., " . . . if you come into Peet's Coffee & Tea™ shop on Fourth Street in the next ten minutes.") Similarly, given that both the location of the ATM and the location of the Peet's Coffee & Tea™ shop are known, a map from the physical address of the ATM to the physical address of the Peet's Coffee & Tea™ shop can be determined and included in the offer communication.

At a step 306, a second transmission is formed to include the offer for rending as a hard copy upon the POI terminal. The second transmission can include the offer of the merchant (m) 104 and instructions for rendering a hard copy of the offer using the POI terminal (e.g., text, font, color, positioning), for example. In one implementation, the offer may be printed within the unused white space of a paper receipt (e.g., the back of the receipt or other available areas on the receipt) that is printed at the POI terminal. In the ATM/Peet's Coffee & Tea™ shop example above, Sally may receive a receipt from the ATM having information about her withdrawal of currency and a hard copy rendering of the Peet's Coffee and Tea™ offer upon the white space of the ATM receipt. In another example, the POI terminal may be a computer of the offer recipient (o) 102. The offer recipient (o) 102 may have engaged in an on-line e-commerce transaction using a computer executing software capable of conducting the on-line transaction via an Internet browser. The offer to the offer recipient (o) 102 may be rendered by a printer communicatively connected to the computer.

Information about the transmission of the offer communication to the offer recipient (o) 102 (e.g., the second transmission) may be traced and stored in the DB 110. The information about the transmission may include the time that the offer communication was formed, the time that the offer communication was sent, the time that the offer communication was received at the POI terminal, how the offer communication was rendered by the POI terminal, or the content of the offer communication that was sent to the offer recipient (o) 102 (e.g., expiration date of the offer that was sent to the offer recipient (o) 102), for example.

In some implementations, one or more announcements about the offer is also sent to the offer recipient (o) 102. The announcement (e.g., another offer communication) may be, for example, to remind the offer recipient (o) 102 of the offer that was previously sent or to augment the content of the previously sent offer communication. The content may be augmented by increasing a value of a discount, extending an expiration date, providing a further incentive such as a gratuitous gift, or associating the sent offer communication with an upcoming anniversary or birthday whose date was previously stored in the DB 110 in association with the offer recipient (o) 102, for example.

Both the announcement and the offer communication previously sent to the offer recipient (o) 102 ("first offer communication) may be rendered in the same format, or may be rendered in a different format. In one implementation, the first offer communication and the corresponding announcement are both rendered in hard copy format (e.g. printed on a paper receipt of the merchant (1) 104 and printed on a paper receipt of the merchant (2) 104, respectively). In another implementation, the first offer communication and the corresponding announcement are both rendered in soft copy format (e.g., rendered on the display of mobile device 202 and rendered on the display of a POI terminal or kiosk, respectively). In yet another implementation, one of the offer and the corresponding announcement may be rendered in a hard copy format while the other is rendered in a soft copy format. An algorithm may be used to determine the format that each of the first offer communication and the announcement are rendered. For example, the determined format for the offer may be a function of past offers sent to the offer recipient (o) 102; a function of the corresponding offer previously sent to the offer recipient (o) 102; and/or a function of other announcements sent to the offer recipient (o) 102.

At a step 308, a retrieval is made of a soft copy capability of a communication device of the offer recipient (o) 102 and the announcement has been designed so as to be compatible with the soft copy capability of the communication device. For example, the GUID of the offer recipient (1) 102 may be used to retrieve, from the DB 110, the soft copy capability of the mobile device 202 of the offer recipient (1) 102. The retrieved soft copy capability of the mobile device 202 may indicate, for example, that the mobile device 202 has a color display, a speaker set at about 40-60 decibels, a ring tone that is typically set to vibrate, and a mobile telephone coverage plan that allows for unlimited receipt of text messages. Here, the retrieved announcement may be a color text about the first offer communication.

As with the first offer communication, the announcement may be retrieved and then made compatible with the communication device of the offer recipient (o) 102; alternatively, only the announcement(s) that are compatible with the soft copy capability is retrieved. In the former, the retrieved announcement, or instructions for rendering the retrieved announcement, may be modified to become compatible with the soft copy capability of the communication device (e.g., printing in black and white instead of color, or changing a font). In the later, the soft copy capability of the communication device may be one of the announcement conditions of the announcement. To illustrate, if the soft copy capability of the communication device of the offer recipient (o) 102 is limited to audio renderings, then the announcement that is retrieved from the DB 110 is one that can be acoustically rendered, not one limited to a photographic rendering, for example. Here, if the original offer has no corresponding announcement that can be acoustically rendered, then no announcement will be sent to that communication device due to a failure to satisfy the announcement's conditions.

The content of the announcement corresponding to the first offer communication may be generic or customized to the offer recipient (o) 102. The generic content may be predetermined by the merchant (m) 104, such as: "don't forget, you have until X to use your Y % off coupon on a Macy's® purchase"), where "X" and "Y" are each populated with information based on the corresponding offer. Here, the "X" may be "this Friday," and "Y" may be "10" such that the generic content of the announcement becomes "don't forget, you have until this Friday to use your 10% off coupon on a Macy's® purchase." Alternatively, or in combination, as with the first offer communication, the content of the announcement may be tailored to the offer recipient (o) 102. For example, the analytics engines 212 may algorithmically analyze the data about the past transactions of the offer recipient (1) 102 stored in the DB 110, and retrieved using the GUID of the offer recipient (o) 102. The analysis may show that the offer recipient (1) 102 redeems previously sent offers more often than not when a follow-up announcement has been sent to the offer recipient (1) 102 including a further incentive of a gratuitous gift. Here, the customized content of the announcement may be modified for the offer recipient (1) 102 to further include a gratuitous gift (e.g., "don't forget, you have until this Friday to use your 10% off coupon on a Macy's® purchase. Come in and we will give you a sample of Calvin Klein's Obsession® perfume for free!").

At a step 310, a third transmission is formed including the announcement for rendering as a soft copy upon the communication device of the offer recipient (o) 102. In the example above, the third transmission may be formed to include the Macy's announcement that is capable of rendering as a soft copy on the mobile device 202 of the offer recipient (o) 102. For example, the announcement may be rendered as digital text on the display of the mobile device 202 and/or acoustically through a speaker of the mobile device 202.

A test signal may be sent to the communication device of the offer recipient (o) 102 prior to the sending of the offer communications (e.g., the first offer communication or the announcement corresponding to the first offer communication). The test signal may be sent to determine, for example: if the communication device is ready to receive transmissions, such as determining if the communication device is "on" or the mobile device 202 has reception from its wireless network carrier; if the content of the transmissions received by the communication device is reasonably accurate, such as a content of a test signal to a content of a return signal from the communication device; or if the security features of the communication device are operative, such as determining if a return message is properly hashed. To illustrate, the transaction handler (th) 206, or agent thereof, may ping the mobile device 202 in order to test whether the mobile device 202 is reachable across the transaction and offer processing system 200. The mobile device 202 may send a corresponding acknowledgement of the ping back to the transaction handler (th) 206. In one implementation, the test signal is sent to query the real time location of the communication device of the offer recipient (o) 102; a response to the test signal may include information sufficient to determine the real time location of the communication device, such as global positioning system (GPS) information received from a GPS enabled mobile device 202.

A real time location of the communication device of the offer recipient (o) 102 may be determined prior to the sending of the announcement. The real time location may be based on a signal received from the communication device of the offer recipient (o) 102, such as a receipt of a transmission or a broadcast having information about the real time location of the communication device of the offer recipient (o) 102. For example, the communication device may be the mobile device 202 with location detecting capabilities as are known in the art (e.g., cellular telephony; triangulation; GPS; or the communication device's detection of wireless networks, the geographic location of which can be determined from a pre-existing database of wireless network locations, etc.). The communication device may receive data sufficient to determine the real time physical location of the communication device, that the communication device, in turn, transmits or broadcasts.

The content of the announcement may include a map or other travel guidance information that can direct the offer recipient (o) 102 to the merchant (m) 104 making the offer. For example, when a real time physical location of both the communication device of the offer recipient (c) 104 and a locality of the merchant (m) 104 at which the offer may be redeemed is known, travel guidance information to get from the communication device location to the locality of the merchant (m) 104 can be determined. The real time physical location of the communication device may be communicated by the communication device to the host (h) 106. The host (h) 106 may receive the transmission or broadcast from the communication device and utilize the data therein to determine the real time location of the communication device. The physical location of merchant (m) 104 may be determined based on the data stored in the DB 110, for example.

The travel guidance information can then be included in the third transmission that is sent to the offer recipient (o) 102. As with the other offer communications, the travel guidance information may be about any number of forms of travel from the communication device location to the locality of the merchant (m) 104, such as: walking, public mass transit, private motorized vehicle, private non-motorized vehicle, or a combination thereof.

The travel guidance information may be a graphical map. The map may be made compatible with the soft copy capability of the communication device of the offer recipient (o) 102. For example, the map may be adjusted to have readable font within a small display of the mobile device 202. Alternatively, or in combination, the map may include a live link to an Internet website, wherein the offer recipient (o) 102 may manipulate parameters for the map such as zoom-in or out options as is known in the art.

The timing of the delivery of the announcement to the offer recipient (o) 102 may be predetermined by the user(s) of the offer system 100, such as the merchant (m) 104, the offer recipient (o) 102, and/or the host (h) 106. For example, the timing of a delivery of the announcement may be delineated by the business rule for the offer, such as "send the subsequent announcement about the offer to the offer recipient (o) 102 within a week after sending the original offer." Based on this business rule, the subsequent announcement may be programmed to be sent to the offer recipient (o) 102 prior to a passage of seven days. An email transmission including the announcement may be formed and sent after the lapse of five days from the sending of the corresponding offer. When the five days lapse, the email transmission is sent to an email address of the offer recipient (o) 102. Alternatively, or in combination, the timing of the delivery of the announcement may be requested by the offer recipient (o) 102. To illustrate, a profile of the offer recipient (o) 102 may have indicated that the offer recipient (o) 102 would like to receive a subsequent announcement about a corresponding offer within twenty-four hours of the delivery of the corresponding offer communication to the offer recipient (o) 102. In this implementation, the host (h) 106 may predetermine the timing of the offer communication(s), such as sending the announcement about the offer after an announcement condition is satisfied. To illustrate, the announcement condition may be specific to a real time location of the mobile device 202 of the offer recipient (o) 102, such as a real time detection of the mobile device 202 within a specified shopping mall. Here, the announcement is sent when the mobile device 202 is detected to be in the shopping mall.

Different timings can be specified for the delivery of an announcement to multiple users. For instance, an announcement may be sent to an offer recipient (o) 102 only when the recipient is located for a first specified amount of time at a specified shopping mall (e.g., where the first specified amount of time is dictated by host (h) 106) within a second specified amount of time after receiving the original offer (where second specified amount of time is specified by the offer or of the original offer). Other examples of a condition of specified amount of time include: prior to an expiration date of the offer; less than one month after the forming of the first offer communication; prior to a date set by the account holder; while the mobile electronic device is detected to be within a physical location; or a combination thereof.

Sometime after receiving the offer communication(s), the offer recipient (o) 102 may either automatically, or with further action, redeem the offer during a transaction with the merchant (m) 104 making the offer. The offer is automatically redeemed when the offer recipient (o) 102 engages in the transaction with the merchant (m) 104 making the offer. To illustrate, if the business rule for the offer dictates that a 5% credit is to be applied to any transaction with the merchant (1) 104 upon an account corresponding to a gold card, then any transaction with the merchant (1) 104 upon any such gold card is eligible for redemption of the offer and the offer can be redeemed automatically without any additional action by either the offer recipient (o) 102 or the merchant (1) 104. Here, the transaction handler (th) 206 may receive the transaction and execute a matching algorithm comparing the offer criterion to the transaction data of the offer recipient's (o) 102 transaction with the merchant (m) 104. If the offer conditions are met, the offer can be redeemed. In another implementation, either or both the offer recipient (o) 102 or the merchant (m) 104 making the offer perform a further action in order to redeem the offer.

For example, indicia about the offer may be presented to merchant (m) 104 prior to redeeming the offer. The offer recipient (o) 102 may present either a hard copy or a soft copy rendering of the offer to the merchant (m) 104 during the transaction. Alternatively, or in combination, the offer recipient (o) 102 may verbally relay the terms of the offer to a cashier at the POI terminal of the merchant (m) 104, such as by relaying an offer code that is then entered into the POI terminal as part of the transaction (e.g., sent to the transaction processing and offer system 200 via an authorization request for the transaction). Thereafter, the transaction handler (th) 206 may run a matching algorithm to determine if the offer condition(s) are met.

In one implementation, the offer recipient (o) 102 redeems the offer after receiving a soft copy rendering of the announcement and engaging in a transaction using an Internet website. For example, the soft copy may be rendered upon a display of the mobile device 202 of the offer recipient (o) 102, such as an email containing a reminder about the offer and a hyperlink to an Internet website at which the offer recipient (o) 102 may redeem the offer. The offer recipient (o) 102 may select the hyperlink, thereby opening a browser in communication with the transaction processing and offer system 200 and accessing the Internet website. The Internet website may provide means for an interactive session, such that the offer recipient (o) 102 may accept the offer and redeem the offer by engaging in the transaction with the merchant (m) 104 making the offer.

At a step 312, a fourth transmission is received, including a confirmation that the offer has been used toward a transaction. If the offer is automatically redeemed, the fourth transmission may be sent from a first engine within the transaction handler (th) 206 to a second engine within the transaction handler (th) 206. Here, the first engine may execute the matching algorithm to find a match between the offer condition and the transaction data for the transaction. Once the match is found, the fourth transmission is sent to the second engine within the transaction handler (th) 206. In another implementation, where the offer is not automatically redeemed, then the fourth transmission may be sent, for example, from the communication device of the offer recipient (o) 102, such as when the offer recipient (o) 102 engages in the transaction redeeming the offer during the Internet website interactive session. Alternatively, or in combination, the fourth transmission may be sent by the merchant (m) 104 indicating that the offer is being used towards the transaction, such as by sending the offer code in the authorization request for the transaction.

In some implementations, redemption of the offer may make the offer recipient (o) 102 eligible for a reward. A second set of business rules associated with the offer may govern the eligibility for the reward. If the redemption of the offer matches a reward condition of the second set of business rules for the reward, then the redemption of the offer qualifies for the reward. To illustrate, the second set of business rules may include "if the offer is redeemed within a day of receiving the announcement about the offer, give the offer recipient (o) 102 fifty American Airlines frequent flyer points." Here, if the transaction handler (th) 206 receives the fourth transmission, which may be an authorization request for the transaction with the merchant (m) 104, within a day of sending the announcement, then the reward condition is satisfied and the offer recipient (o) 102 qualifies for the reward of the fifty American Airlines frequent flyer points. The payment engines 208 of the transaction handler (th) 206 may utilize data received from the points processor 204, which may be stored in the DB 110, to calculate the reward amount or to apply the reward towards a frequent flyer account. In another illustration, the reward condition may include "If the offer is redeemed, then send a prepaid card valued at $10 dollars US to the home address of the offer recipient (o) 102." Here, the reward condition is satisfied by a redemption of the offer and the reward as a consequence of such satisfaction is a physical prepaid card that is sent to the offer recipient (o) 102. Any combination of reward conditions and rewards are applicable, as would be known by those of ordinary skill in the art.

At a step 314, data about the reward corresponding to the received confirmation is retrieved. For example, if the redemption of the offer makes the offer recipient (o) 102 eligible to receive the reward, the payment engines 208 may calculate that the offer recipient (o) 102 is eligible to receive the reward (e.g., fifty frequent flyer points). A result of the calculation may be stored in the DB 110. At the step 314, the interactive intelligence engine 214 may execute an algorithm to retrieve the result from the DB 110 and submit the result to the corresponding offer recipient (o) 102. Alternatively, if the redemption of the offer does not make the offer recipient (o) 102 eligible to receive the reward (e.g., an action for redemption of the offer was not conducted in time to receive the reward in the above example), the data retrieved about the reward may indicate the ineligibility of the offer recipient (o) 102 to receive the reward. (e.g. "Sorry, your redemption of the offer did not qualify for the $10 dollars US prepaid card. Try again with your next offer which is coming soon!")

At a step 316, a fifth transmission is formed, including information about offer communications or rewards. The fifth transmission may be for delivery to one or more users of the offer system 100 such as the issuer of the account to the offer recipient (o) 102. For example, at the step 316, the fifth transmission may be formed, including the data about the reward for rendering as a soft copy upon the communication device of the offer recipient (o) 102. The data about the reward sent to the offer recipient (o) 102, may include the offer recipient's (o) 102 eligibility for the reward, the value of the reward, other actions that the offer recipient (o) 102 may take to receive the value of the reward, means to initiate an interactive session with the offer recipient (o) 102 to inquire further about the reward (e.g., via a web browser), or provide a report on a plurality of rewards that the offer recipient (o) 102 may have received or was eligible for in the past, for example.

Alternatively, or in combination, the data about the reward may be rendered by the communication device of the merchant (m) 104 that engaged in a transaction with the offer recipient (o) 102. For example, the data about the reward associated with a redeemed offer of the merchant (1) 104 may be printed on the white space of a receipt for the transaction between the merchant (2) 104 and the offer recipient (o) 102.

Other combinations of hard copy and soft copy renderings of offer communications or rewards are also applicable. In one implementation, a soft copy rendering of the offer is initially communicated to the offer recipient (o) 102 at a POI terminal of the merchant (1) 104 (e.g., via an Internet browser), the announcement about the offer is rendered as a hard copy at a POI terminal (e.g., cash register) of the merchant (2) 104 while the offer recipient (o) 102 is engaging in a transaction unrelated to the offer of the merchant (1) 104, or the data about the reward is rendered as a soft copy, acoustically relayed to the offer recipient (o) 102 via the mobile device 202. Similarly, the first offer communication, announcement, and data about the reward may each be rendered in soft copy form or each rendered in hard copy form.

Exemplary Transaction Processing System

A transaction processing system facilitates the processing of cashless transactions conducted through the use of an account such as a debit account, a credit account, a checking account, or a loyalty account where points can be redeemed (e.g., 50 reward points in a loyalty program are equal to $20(US) toward a purchase). Other examples of the accounts include: debit, revolving credit, charge, stored-value, prepaid (e.g., reloadable account, Flexible Spending Account, Healthcare Savings Account), gift, commercial, corporate, government, or a combination thereof.

Figure 4:
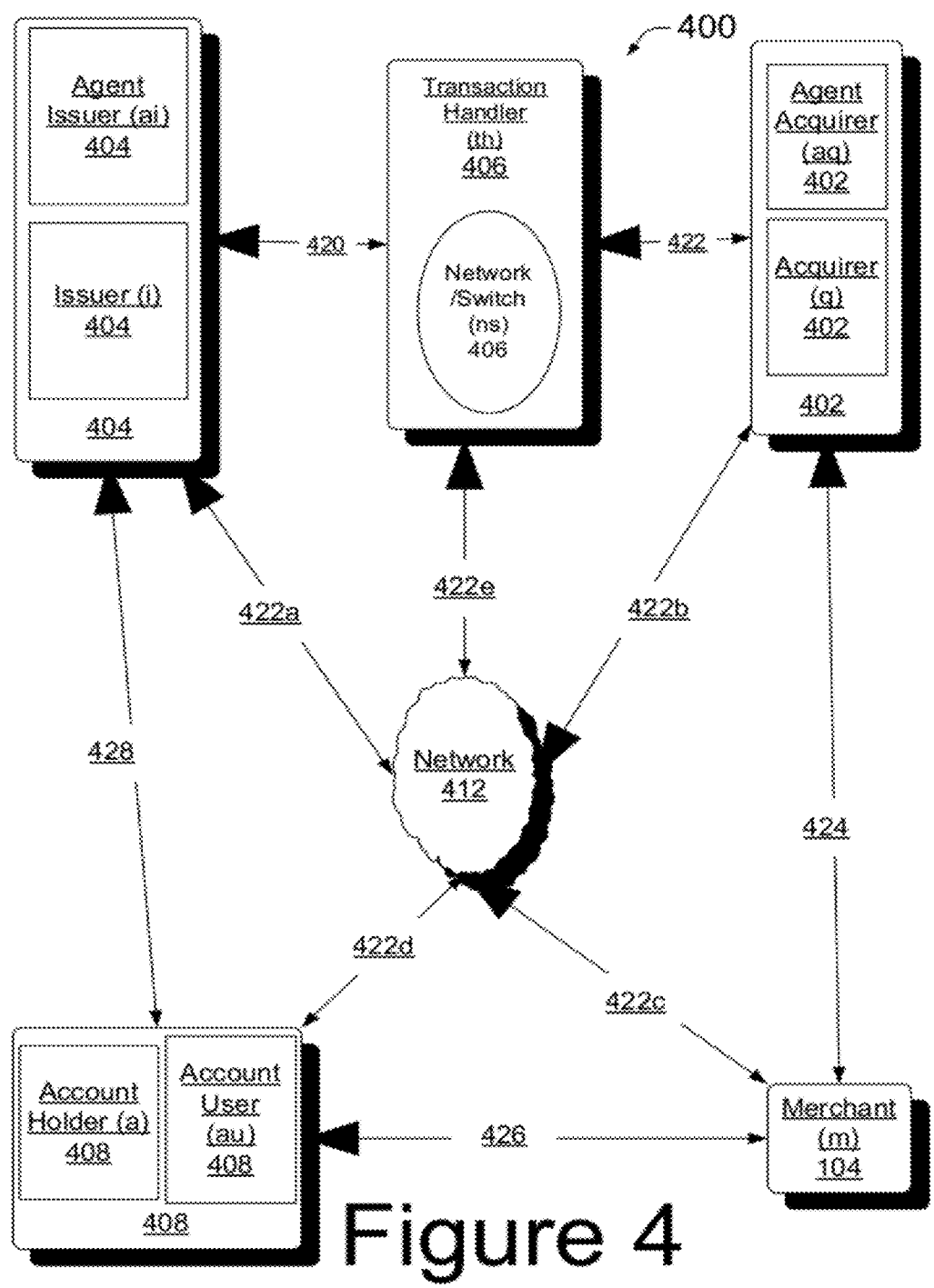
FIG. 4 depicts a block diagram of an exemplary transaction processing system.

An exemplary transaction processing system 400 is depicted in FIG. 4. Transaction processing system 400 can be operated in the environment of FIG. 1 in which an offer recipient (o) 102 of the implementations disclosed herein can receive an offer communication. The general environment of FIG. 4 includes that of a merchant (m) 104 who can conduct a transaction for goods and/or services ("resources") with an account user (au) (e.g., offer recipient (o) 102) on an account issued to an account holder (a) 408 by an issuer (i) 404, where the processes of paying and being paid for the transaction are coordinated by a transaction handler (th) 406 (e.g., the transaction handler (th) 206). The transaction handler (th) 406 can be transaction handler (1) 406 through transaction handler (TH) 406, where "TH" can be up to and greater than an eight digit integer. The transaction includes participation from different entities that are each a component of the transaction processing system 400. The transaction processing system 400 has a plurality of merchants 104 and transaction handlers 406. Transaction processing system 400 has a plurality of accounts 408 each of which is held by a corresponding account holder (1) 408 through account holder (a) 408, where A can be up to and greater than a ten digit integer.

Transaction processing system 400 includes account user (1) 408 through account user (AU) 408, where AU can be as large as a ten digit integer or larger. Each account user (au) conducts a transaction with merchant (m) 104 for goods and/or services using the account that has been issued by an issuer (i) 404 to a corresponding account holder (a) 408. Data from the transaction on the account is collected by the merchant (m) 104 and forwarded to a corresponding acquirer (a) 402. Acquirer (a) 402 forwards the data to the transaction handler (th) 406 who facilitates payment for the transaction from the account of the account holder (a) 408 issued by the issuer (i) 404.

Transaction processing system 400 has a plurality of issuers (1-i) 404. Each issuer (i) 404 may be assisted in processing one or more transactions by a corresponding agent issuer (ai) 404, where 'i' can be an integer from 1 to I, where 'ai' can be an integer from 1 to AI, and where I and AI can be as large as an eight digit integer or larger.

Transaction processing system 400 has a plurality of acquirers (q) 402. Each acquirer (q) 402 may be assisted in processing one or more transactions by a corresponding agent acquirer (aq) 402, where 'q' can be an integer from 1 to Q, where aq can be an integer from 1 to AQ, and where Q and AQ can be as large as an eight digit integer or larger. Each acquirer (q) 402 may be assisted in processing one or more transactions by a corresponding agent acquirer (aq) 402, where 'q' can be an integer from 1 to Q, where aq can be an integer from 1 to AQ, and where Q and AQ can be as large as a eight digit integer or larger.

The transaction handler (th) 406 may process a plurality of transactions within the transaction processing system 400. The transaction handler (th) 406 can include one or a plurality or networks and switches (ns) 406. Each network/switch (ns) 406 can be a mainframe computer in a geographic location different than each other network/switch (ns) 406, where 'ns' is an integer from one to NS, and where NS can be as large as a four digit integer or larger.

Dedicated communication systems 420, 422 (e.g., private communication network(s)) facilitate communication between the transaction handler (th) 406 and each issuer (i) 404 and each acquirer (a) 402. The Network 412, via e-mail, the World Wide Web, cellular telephony, and/or other optionally public and private communications systems, can facilitate communications 422a-422e among and between each issuer (i) 404, each acquirer (a) 402, each merchant (m) 104, each account holder (a) 408, and the transaction handler (th) 406. Alternatively and optionally, one or more dedicated communication systems 424, 426, and 428 can facilitate respective communications between each acquirer (a) 402 and each merchant (m) 104, each merchant (m) 104 and each account holder (a) 408, and each account holder (a) 408 and each issuer (i) 404, respectively.

Merchant (m) 104 may be a person or entity that sells goods and/or services. Merchant (m) 104 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 408 may be a second merchant (m) 104 making a purchase from another merchant (m) 104. Merchant (m) 104 may utilize at least one point-of-interaction terminal (e.g., Point of Service or browser enabled consumer cellular telephone) that can communicate with the account user (au) 408, the acquirer (a) 402, the transaction handler (th) 406, or the issuer (i) 404. Thus, the point-of-interaction terminal is in operative communication with the transaction processing system 400.

Each account 408 may be associated with a corresponding account identifier. The corresponding account identifier may be, for example, any code, symbol, number, letter, digital signal, analog signal, digital certificate, biometric code, or other indicia usable to distinguish or identify the account holder (a) 408, the account user (au) 408, or the corresponding account 408. Nonetheless, the account identifier of the corresponding account 408 may be used to distinguish past transactions of the account holder (a) 408 or the account user (au) 408, without knowing the identity of the account holder (a) 408 or the account user (au) 408 (e.g., the legal name of the account holder (a) 408). For example, if ten of the past transactions of the account holder (a) 408 stored in the DB 110 were each conducted upon the account 408 with the account identifier "4234567890123456," then each of the ten past transactions can be distinguished by filtering the data in the DB 110 using the account identifier "4234567890123456," even without knowing the legal name of the account holder (a) 408 to whom the account was issued by issuer (i) 402.

The corresponding account identifier can be used for purposes other than distinguishing the account 408, activities on the account 408, the account holder (a) 408, or the account user (au) 408, within the transaction processing system 400. For example, the corresponding account identifier may be a numeric code, wherein the first six numbers are a Bank Identification Number (BIN) that denotes the issuing bank and the category of the account associated with the corresponding account identifier (e.g., "gold card" account).

A portable consumer device (PCD) may be associated with an account 408 of account holder (a) 408 that was issued to the account holder (a) 408 by issuer (i) 404. The PCD may be in a form factor that can be a payment card, a gift card, a smartcard, a smart media, a payroll card, a healthcare card, a wrist band, a machine readable medium containing account information, a keychain device, such as a SPEEDPASS® device commercially available from ExxonMobil Corporation, a supermarket discount card, a cellular telephone, personal digital assistant, a pager, a security card, an access card, a wireless terminal, or a transponder. For example, the PCD may include a volatile or non-volatile memory to store information such as the account number or an account holder (a) 408's name.

The PCD may interface with the point-of-interaction terminal using a mechanism including any suitable electrical, magnetic, or optical interfacing system such as a contactless system using radio frequency or magnetic field recognition system or contact system such as a magnetic stripe reader. The point-of-interaction terminal sends a transaction authorization request to the issuer (i) 404 of the account associated with the portable consumer device. Alternatively, or in combination, the portable consumer device may communicate with issuer (i) 404, transaction handler (th) 406, or acquirer (a) 402.

Typically, a transaction begins with account holder (a) 408 or the account user (au) 408 presenting a corresponding account identifier of an account 408 to the merchant (m) 104 to initiate an exchange of currency for a resource. Other data that may be presented to merchant (m) 104 may include a corresponding: expiration date, a consumer name (e.g. a name of the offer recipient (o) 102), and/or a Personal Identification Number (PIN). The transfer of data may be in any format recognizable by the merchant (m) 104, such as in a magnetic stripe track data format. For example, the account holder (a) 408 may present the PCD that is associated with the account 408 to the POI of the merchant (m) 104 by swiping a plastic card in a magstripe card reader at the POI or by bringing an RFID enabled PCD in an effective proximity of an RFID reader so as to be interrogated.

Thereafter, the merchant (m) 104 may use the POI to form an authorization request that may including transaction information about the resource being purchased and the account identifier received from the account holder (a) 408. The transaction information may have several data fields. For example, as is known by those of ordinary skill in the relevant art, the data fields may include: a name of the account holder (a) 408, the account identifier (e.g., Primary Account Number or "PAN"), an expiration date of the PCD, a Card Verification Value (CVV), a Personal Identification Number (PIN), a discretionary code of the issuer of the account, a date, a time of the transaction, a merchant identifier (e.g., merchant indicator) of the corresponding merchant (m) 104, data usable to determine a location of the merchant (m) 104, a POI identifier, a total transaction amount, a Universal Product Code of the resource being purchased, a Stock Keeping Unit of the resource being purchased, a promotion code, an offer code, or an acquirer code of the acquirer (q) 402 associated with the corresponding merchant (m) 104.

The authorization request may be communicated to the acquirer (q) 402. The acquirer (q) 402 forwards the authorization request, and perhaps other information, to transaction handler (th) 406. Transaction handler (th) 406 may, in turn, forward the authorization request, and perhaps other information, to the issuer (i) 404 that issued the account. In some implementations, the transaction handler (th) 406 may forward the authorization request to another transaction handler (th-1) 406 who then forwards the authorization request to issuer (i) 404.

Issuer (i) 404 may authorize the transaction and forward same to the transaction handler (th) 406. Transaction handler (th) 406 may also clear the transaction. Authorization includes issuer (i) 404, or transaction handler (th) 406 on behalf of issuer (i) 404, authorizing the transaction in connection with issuer (i) 404's instructions such as through the use of rules. For example, the issuer (i) 404 may determine that the account has enough funds to cover paying for the resources being purchased or that the transaction has a low risk of fraud based on a determined location of the merchant (m) 104 that is conducting the transaction with account holder (a) 408. Thereafter, the issuer (i) 402 may form the authorization response for delivery to the transaction handler (th) 406. The transaction handler (th) 406 may forward the authorization response to the acquirer (q) 402, who in turn forwards the authorization response to merchant (m) 104. Once approved, the merchant (m) 104 may record the authorization, allowing the account user (au) 408 to receive the resource from the merchant (m) 104 or an agent thereof.

The merchant (m) 104 may, at discrete periods, such as the end of the day, submit a list of authorized transactions to the acquirer (q) 402 or other transaction related data for processing through the transaction processing system 400, such as for clearing and settlement. Clearing includes the exchange of financial information between the issuer (i) 404 and the acquirer (a) 402 and settlement includes the exchange of funds. The transaction handler (th) 406 may route the clearing and settlement request from the corresponding acquirer (q) 402 to the corresponding issuer (i) 404 that is involved in the corresponding transaction. Once the acquirer (q) 402 receives the funds from the account upon which the transaction was conducted, where the funds received from issuer (i) 402 matches a payment for the purchased resource, acquirer (q) 402 can make the funds available to the merchant (m) 104 less any transaction costs, such as fees. The settlement of the transaction may include depositing an amount of the transaction settlement from a settlement house, such as a settlement bank, which transaction handler (th) 406 typically chooses, into a clearinghouse, such as a clearing bank, that acquirer (a) 402 typically chooses. The issuer (i) 404 deposits the same from a clearinghouse, such as a clearing bank, which the issuer (i) 404 typically chooses, into the settlement house. If the transaction involves a debit or pre-paid account, the acquirer (q) 402 may choose not to wait for the transfer of funds prior to paying the merchant (m) 104.

The transaction handler (th) 406 may maintain a log or history of the transactions as they pass through the transaction processing system 400. In one implementation, the transaction handler (th) 406 may store the transaction information received during the processing of the transaction in the DB 110, such as: the transaction information received in the authorization request, the authorization response, or data received during the clearing and settlement process. There may be intermittent steps in the foregoing process, some of which may occur simultaneously. Thus, a typical transaction involves various entities to request, authorize, and fulfill processing the transaction.

The transaction processing system 400 will preferably have network components suitable for scaling the number and data payload size of transactions that can be authorized, cleared and settled in both real time and batch processing. These include hardware, software, data elements, and storage network devices for the same. Examples of transaction processing system 400 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 406 can include one or more data centers for processing transactions, where each transaction can include up to 100 kilobytes of data or more. The data corresponding to the transaction can include information about the types and quantities of goods and services in the transaction, information about the account holder (a) 408, the account user (au) 408, the merchant (m) 104, tax and incentive treatment(s) of the goods and services, offers, coupons, rebates, rewards, loyalty, discounts, returns, exchanges, cash-back transactions, etc.

By way of example, network/switch (ns) 406 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 404 (or agent issuer (ai) 404 thereof) and each acquirer (a) 402 (or agent acquirer (aq) 402 thereof) can use or more router/switch (e.g., Cisco™ routers/switches) to communicate with each network/switch (ns) 406 via dedicated communication systems.

Transaction handler (th) 406 can store information about transactions processed through transaction processing system 400 in data warehouses such as may be incorporated as part of the plurality of networks/switches 406. This information can be data mined. The data mining transaction research and modeling can be used for advertising, merchant offers, account holder and merchant loyalty incentives and rewards, fraud detection and prediction, and to develop tools to demonstrate savings and efficiencies made possible by use of the transaction processing system 400 over paying and being paid by cash, or other traditional payment mechanisms.

The VisaNet® system is an example component of the transaction handler (th) 406 in the transaction processing system 400. Presently, the VisaNet® system is operated in part by Visa Inc. As of 2007, the VisaNet® system Inc. was processing around 300 million transactions daily, on over 1 billion accounts used in over 170 countries. Financial instructions numbering over 16,000 connected through the VisaNet® system to around 30 million merchants (m) 104. In 2007, around 81 billion transactions for about 4 trillion U.S. dollars were cleared and settled through the VisaNet® system, some of which involved a communication length of around 24,000 miles in around two (2) seconds.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in computer readable medium that can be loaded onto a general purpose computer, a special purpose computer, or other programmable apparatus.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method, comprising:
receiving, by a transaction handler, a first transmission corresponding to a first transaction between a first consumer and a first merchant, the first transmission comprising data corresponding to a first point of interaction terminal of the first merchant, the first transmission including a globally unique identifier of the first consumer, and the first transmission further including information sufficient to determine a hard copy capability of the first point of interaction terminal, wherein the first transmission is an authorization request for the first transaction, sent from the first point of interaction terminal, and wherein the authorization request includes a merchant identifier for the first merchant;
determining the hard copy capability of the first point of interaction terminal by comparing the merchant identifier to at least one database comprising merchant identifiers, wherein the hard copy capability specifies a capability of the first point of interaction terminal in generating a hard copy of offers, and wherein the specified capability includes dimensions of a hard copy output of the first point of interaction terminal, and white space availability on receipts rendered by the first point of interaction terminal;
retrieving, by a computing apparatus, using the globally unique identifier, an offer for the first consumer that is compatible with the hard copy capability and usable towards a future transaction with a second merchant, wherein the offer is retrieved based on business rules of the second merchant, wherein the offer is based on prior transaction data obtained from the database using the globally unique identifier, wherein the offer is further based on data obtained from the first transmission regarding a real-time location of the first consumer, wherein the offer is subject to at least one criterion comprising a category of an account of the first consumer, and the at least one criterion further comprising the transaction handler receiving transaction data about a transaction between the first consumer and a merchant associated with the category, and wherein the business rules comprise a rule for the offer that delineates the hard copy capability as a condition of the offer;
forming a second transmission including the offer for delivery to, and rendering as a hard copy upon, the first point of interaction terminal along with a receipt for the first transaction;
storing data in the database based on tracing the delivery of the second transmission;
retrieving, by the computing apparatus, from the database using the globally unique identifier, a soft copy capability of a mobile electronic device of the first consumer and an announcement, including a reference to the offer, that is compatible with the soft copy capability;
sending a test signal for delivery to the mobile electronic device to determine that the mobile electronic device is ready to receive a transmission, and receiving an acknowledgement of receipt of the test signal by the mobile electronic device;
in response to receiving the acknowledgement of receipt, forming a third transmission including the announcement for delivery to, and rendering as a soft copy upon, the mobile electronic device within a predetermined period of time after the forming of the second transmission;
receiving a fourth transmission including a confirmation that the future transaction has been conducted at a second point of interaction terminal of the second merchant;
retrieving data about a reward corresponding to the future transaction; and
forming a fifth transmission including the data about the reward for delivery to, and rendering as a hard copy upon, the second point of interaction terminal of the second merchant.

2. The method of claim 1, further comprising:
receiving a physical location of the first point of interaction terminal;
determining a map from the physical location of the first point of interaction terminal to a physical location of the second merchant, wherein the map is compatible with the hard copy capability of the first point of interaction terminal; and
wherein the second transmission further includes the map.

3. The method of claim 1, wherein the forming of the third transmission further comprises:
receiving a physical location of the mobile electronic device; and
determining a map from the physical location of the mobile electronic device to a physical location of the second merchant, wherein the map is compatible with the soft copy capability of the mobile electronic device; and
wherein the announcement includes the map.

4. The method of claim 3, wherein the map comprises instructions for a form of travel selected from the group consisting of:
walking;
public mass transit;
private motorized vehicle;
private non-motorized vehicle; and
a combination thereof.

5. The method of claim 1, further comprising:
forming a sixth transmission including the data about the reward for delivery to, and rendering as a soft copy upon, the mobile electronic device.

6. The method of claim 1, wherein the predetermined period of time is selected from the group consisting of:
a period prior to an expiration date of the offer;
a period less than one month after the forming of the second transmission;
a period prior to a date set by the first consumer;
a period in which the mobile electronic device is detected to be within a physical location; and
a combination thereof.

7. The method of claim 1, wherein:
the hard copy rendered at the second point of interaction terminal is rendered along with a receipt for the future transaction.

8. The method of claim 7, further comprising forming a sixth transmission for delivery to the first consumer, the sixth transmission including information selected from the group consisting of:
- data about the offer rendered as the hard copy upon the first point of interaction terminal;
- data about the announcement rendered as the soft copy upon the mobile electronic device;
- information about the reward corresponding to the confirmation; and
- a total value for a plurality of rewards corresponding to a plurality of confirmations.

9. The method of claim 1, further comprising receiving a plurality of transmissions each including a transaction upon an account of the first consumer, and wherein the retrieving the offer further includes comparing an offer a criterion of the offer with data included in at least one of the plurality of transmissions to find a match.

10. A method, comprising:
- receiving, by a transaction handler, a first transmission corresponding to a first transaction between a first consumer and a first merchant, the first transmission comprising data corresponding to a point of interaction terminal of the first merchant, a globally unique identifier of the first consumer, and a hard copy capability of the point of interaction terminal, wherein the first transmission is an authorization request for the first transaction, sent from the point of interaction terminal, and wherein the authorization request includes a merchant identifier for the first merchant;
- determining the hard copy capability of the point of interaction terminal by comparing the merchant identifier to at least one database comprising merchant identifiers, wherein the hard copy capability specifies a capability of the point of interaction terminal in generating a hard copy of offers, and wherein the specified capability includes dimensions of a hard copy output of the point of interaction terminal, and white space availability on receipts rendered by the point of interaction terminal;
- retrieving, by a computing apparatus, using the globally unique identifier, an offer for the first consumer that is compatible with the hard copy capability of the point of interaction terminal and usable towards a second transaction with a second merchant subsequent to the first transaction, wherein the offer is based on prior transaction data obtained from the database using the globally unique identifier, wherein the offer is further based on data obtained from the first transmission regarding a real-time location of the first consumer, wherein the offer is subject to at least one criterion comprising a category of an account of the first consumer, and the at least one criterion further comprising the transaction handler receiving transaction data about a transaction between the first consumer and a merchant associated with the category, and wherein business rules comprise a rule for the offer that delineates the hard copy capability as a condition of the offer;
- forming a second transmission including the offer for delivery to, and rendering as a hard copy upon, the point of interaction terminal along with a receipt for the first transaction;
- storing data in the database based on tracing the delivery of the second transmission;
- retrieving, by the computing apparatus, from the database using the globally unique identifier, a soft copy capability of a mobile electronic device of the first consumer, and an announcement, including a reference to the offer, that is compatible with the soft copy capability;
- forming a third transmission including the announcement for delivery to, and rendering as a soft copy upon, the mobile electronic device;
- receiving a fourth transmission including a confirmation that the second transaction has been conducted;
- retrieving, using the offer, data about a reward corresponding to the confirmation; and
- forming a fifth transmission including the data about the reward for delivery to, and rendering as a soft copy upon, the mobile electronic device.

11. The method of claim 10, further comprising:
- receiving a physical location of the point of interaction terminal; and
- determining a map from the physical location of the point of interaction terminal to a physical location of the second merchant, wherein the map is compatible with the hard copy capability of the point of interaction terminal; and
- wherein the second transmission further includes the map.

12. The method of claim 10, wherein the forming of the third transmission further comprises:
- receiving a physical location of the mobile electronic device; and
- determining a map from the physical location of the mobile electronic device to a physical location of the second merchant, wherein the map is compatible with the soft copy capability of the mobile electronic device; and
- wherein the announcement further includes the map.

13. The method of claim 10, further comprising forming a sixth transmission for delivery to the first consumer, the sixth transmission including information selected from the group consisting of:
- data about the offer;
- data about the announcement;
- information about the reward corresponding to the confirmation; and
- a total value for a plurality of rewards corresponding to a plurality of confirmations.

14. A non-transitory computer readable medium including stored instructions that, when executed by a computing device, cause the computing device to:
- receive, by a transaction handler, a first transmission, corresponding to a first transaction between a first consumer and a first merchant, comprising data corresponding to a point of interaction terminal of the first merchant, the first transmission including a globally unique identifier of the first consumer corresponding to an account, and further including a hard copy capability of the point of interaction terminal, wherein the first transmission is an authorization request for the first transaction, sent from the point of interaction terminal, and wherein the authorization request includes a merchant identifier for the first merchant;
- determining the hard copy capability of the point of interaction terminal by comparing the merchant identifier to at least one database comprising merchant identifiers, wherein the hard copy capability specifies a capability of the point of interaction terminal in generating a hard copy of offers, and wherein the specified capability includes dimensions of a hard copy output of the point of interaction terminal, and white space availability on receipts rendered by the point of interaction terminal;

retrieve, by a computing apparatus, using the globally unique identifier, an offer for the first consumer that is compatible with the hard copy capability of the point of interaction terminal and usable towards a future transaction with a second merchant upon the account, wherein the offer is retrieved based on business rules of the second merchant, wherein the offer is based on prior transaction data obtained from the database using the globally unique identifier, wherein the offer is further based on data obtained from the first transmission regarding a real-time location of the first consumer, wherein the offer is subject to at least one criterion comprising a category of an account of the first consumer, and the at least one criterion further comprising the transaction handler receiving transaction data about a transaction between the first consumer and a merchant associated with the category, and wherein the business rules comprise a rule for the offer that delineates the hard copy capability as a condition of the offer;

form a second transmission including the offer for delivery to, and rendering as a hard copy upon, the point of interaction terminal along with a receipt associated with the first transmission;

store data in the database based on tracing the delivery of the second transmission;

retrieve, by the computing apparatus, from the database using the globally unique identifier, a soft copy capability of a mobile electronic device of the first consumer and an announcement, including a reference to the offer, that is compatible with the soft copy capability; receive a physical location of the mobile electronic device;

determine a map from the physical location of the mobile electronic device to a physical location of the second merchant, wherein the map is compatible with the soft copy capability of the mobile electronic device, and wherein the announcement further includes the map; and form a third transmission including the announcement for delivery to, and rendering as a soft copy upon, the mobile electronic device.

15. The non-transitory computer readable medium of claim 14, wherein the stored instructions further cause the computing device to:

receive a fourth transmission including a confirmation that the future transaction has been conducted;

retrieve data about a reward corresponding to the confirmation; and form a fifth transmission including the data about the reward for delivery to, and rendering as a soft copy upon, the mobile electronic device.

16. The non-transitory computer readable medium of claim 14, wherein the third transmission is formed within a predetermined period of time after the forming of the second transmission, and the predetermined period of time is selected from the group consisting of:

a period prior to an expiration date of the offer;

a period less than one month after the forming of the second transmission;

a period prior to a date set by the first consumer;

a period in which the mobile electronic device is detected to be within a physical location; and a combination thereof.

17. A system, comprising:

a data storage device storing transaction data related to a plurality of transactions processed by a payment engine, the transactions including a first transaction between a first consumer and a first merchant;

an analytics engine to select an offer for a future transaction of the first consumer with a second merchant based at least in part on a portion of the transaction data, and to form an announcement that makes reference to the offer, wherein the offer is based on prior transaction data obtained from the data storage device using an account identifier of the first consumer;

at least one processor; and memory storing instructions configured to instruct the at least one processor to:

receive data from a point of interaction terminal of the first merchant, the data including the account identifier, a hard copy capability of the point of interaction terminal, and an authorization request for the first transaction, wherein the authorization request includes a merchant identifier for the first merchant, wherein the hard copy capability specifies a capability of the point of interaction terminal in generating a hard copy of offers, and wherein the specified capability includes dimensions of a hard copy output of the point of interaction terminal, and white space availability on receipts rendered by the point of interaction terminal;

retrieve, from the data storage device using the account identifier, the offer, wherein the offer is based at least in part on data received from the point of interaction terminal regarding a real-time location of the first consumer, wherein the offer is subject to at least one criterion comprising a category of an account of the first consumer, and the at least one criterion further comprising a transaction handler receiving transaction data about a transaction between the first consumer and a merchant associated with the category, and wherein business rules comprise a rule for the offer that delineates the hard copy capability as a condition of the offer;

form a first transmission including the offer for delivery to the point of interaction terminal;

store data in the data storage device based on tracing transmission of the offer to the point of interaction terminal;

retrieve, using the account identifier, the announcement;

send a test signal for delivery to the mobile electronic device;

receive an acknowledgement of receipt of the test signal;

form a second transmission including the announcement for delivery to a mobile electronic device of the first consumer;

receive a confirmation that the future transaction has been conducted;

retrieve data about a reward corresponding to the confirmation; and form a transmission including the data about the reward for delivery to the mobile electronic device.

* * * * *

UNITED STATES PATENT AND TRADEMARK OFFICE
CERTIFICATE OF CORRECTION

PATENT NO. : 9,909,879 B2  
APPLICATION NO. : 13/427657  
DATED : March 6, 2018  
INVENTOR(S) : James Alan Vonderheide et al.

Page 1 of 1

It is certified that error appears in the above-identified patent and that said Letters Patent is hereby corrected as shown below:

In the Claims

Column 27, Line 16, Claim 9, after "comparing" delete "an offer"

Signed and Sealed this  
Twenty-second Day of May, 2018

Andrei Iancu  
*Director of the United States Patent and Trademark Office*